(12) United States Patent
Dateki et al.

(10) Patent No.: US 8,335,482 B2
(45) Date of Patent: *Dec. 18, 2012

(54) RADIO COMMUNICATIONS METHOD, TRANSMITTER, AND RECEIVER

(75) Inventors: Takashi Dateki, Kawasaki (JP); Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,028

(22) Filed: Feb. 27, 2012

(65) Prior Publication Data

US 2012/0156990 A1 Jun. 21, 2012

Related U.S. Application Data

(63) Continuation of application No. 12/132,311, filed on Jun. 3, 2008, now Pat. No. 8,150,347, which is a continuation of application No. PCT/JP2005/023957, filed on Dec. 27, 2005.

(51) Int. Cl.
*H04B 1/18* (2006.01)
(52) U.S. Cl. .............. 455/168.1; 455/176.1; 455/177.1
(58) Field of Classification Search .............. 455/168.1, 455/176.1, 177.1, 62, 180.1, 188.1, 450, 455/452.2, 422.1, 224, 266, 343.5, 39, 3.01, 455/179.1
See application file for complete search history.

(56) References Cited

U.S. PATENT DOCUMENTS
8,150,347 B2 * 4/2012 Dateki et al. .............. 455/168.1

FOREIGN PATENT DOCUMENTS
WO 2005/079033 8/2005
WO 2005/122425 12/2005

OTHER PUBLICATIONS

Extended European Search Report with supplement and written opinion issued for corresponding European Patent Application No. 05822727.3 dated Nov. 15, 2011.
NTT DoCoMo; 3GPP TSG RAN WG1 Ad HOC on LTE; R1-050590; "Physical Channels and Multiplexing in Evolved UTRA Downlink"; dated Jun. 2005.
NTT DoCoMo et al.; TSG-RAN WG1 #42bis; R1-051147; "Basic Structure of Control Channel and Synchronization Channel for Scalable Bandwidth in Evolved UTRA Downlink"; dated Oct. 2005.
ZTE; 3GPP TSG-RAN1 WG1 #42bis; R1-051072; "TP for Downlink Synchronization Channel Schemes for E-UTRA"; dated Oct. 2005.
Samsung; 3GPP TSG RAN WG1 Meeting #43; R1-051342; "Multiplexing of Broadcast and Unicast Traffic"; dated Nov. 2005.

(Continued)

*Primary Examiner* — Eugene Yun
(74) *Attorney, Agent, or Firm* — Myers Wolin, LLC

(57) ABSTRACT

A communications system, including a transmitter and a receiver that performs radio communications with the transmitter in a plurality of types of communications services, the transmitter includes, a controller that controls guard intervals at a plurality of codes, which are unique to respective cells and correspond to any one of the plurality of types of communications services, so that lengths of guard intervals of the plurality of codes become same; and a transmitting unit that transmits first codes among the plurality of codes using a first band set in a transmission band, and also transmits second codes among the plurality of codes different from the first codes using a second band set in the transmission band that is different from the first band set, and the receiver includes, a receiving unit that receives the plurality of codes transmitted from the transmitter.

2 Claims, 32 Drawing Sheets

OTHER PUBLICATIONS

NTT DoCoMo; 3GPP TSG RAN WG1 Meeting #41; "Physical Channel Structures for Evolved UTRA" R1-050464; dated May 2005.

Japanese Patent Office Notice of Ground(s) of Rejection for corresponding Japanese Patent Application No. 2007-551838, dispatched Aug. 25, 2009.English translation attached.

United States Patent Office Non-Final Office Action issued for corresponding U.S. Appl. No. 12/132,311, dated Jul. 7, 2011.

3GPP RI-050707, "Physical Channels and Multiplexing in Evlolved Utra Downlike" NTT DoCoMo, NEC, SHRAP; Aug. 29, 2005.

3GPP TSG RAN WG1 Meeting #43 (RI-051549), "Cell Search Procedure for Initial Synchronization and Neighbour Cell Identification" Nokia; Nov. 7, 2005.

M. Tanno, et al. "Three-Step Fast Cell Search Algorithm Utilizing Common Pilot Channel for Forward Link Broadband OFCDM Packet Wireless Access" Technical Report of IEICE. RCS2002-40, CQ2002-40, pp. 135-140, Apr. 2002.

3GPP TSG RAN WGI Meeting #43(RI-05143I ), "Multiplexing of MulticastIBroadcast and Unicast Services", HUAWEI; Nov. 7, 2005.

3GPP TSG-RAN WGI Meeting AD HOC LTE RI-060235, "Further Consideration on Muliplexing of Unicase and MBMS", HUAWEI; Jan. 2006.

3GPP TR 25.814 VO.5.0 "3' Generation Partnership Project; Technical Specification Group Radio Access Network" Physical Layer Aspects for Evolved Utra Nov. 2005.

3GPP TSG RAN WGI #43 (RI-051300); "MDMS Transmission In E-UTRA", LG Electronics; Nov. 2005.

3GPP TSG-RAN WGI #43 (RI-051493); "TP on Channel Structure for E-UTRA MBMS Evalutaion" Qualcomm Europe; Nov. 2005.

3GPP TSGRAN WGI AD HOC on LTE RI-050636; "EUTRA Downlink Unicast and Multicast Macro Diversity", ZTE; Jun. 2005.

* cited by examiner

RADIO COMMUNICATIONS METHOD, TRANSMITTER, AND RECEIVER

CROSS-REFERENCE TO RELATED APPLICATION

The present application is a continuation of U.S. application Ser. No. 12/132,311, filed on Jun. 3, 2008, now pending which is a continuation of International Application PCT/JP2005/023957, filed Dec. 27, 2005, the contents of each are herein wholly incorporated by reference.

TECHNICAL FILED

The present invention relates to a radio communications method, a transmitter, and a receiver. The invention relates to technology suitable for use in, for 10 example, a system in which the pilot signals corresponding to multiple types of communications services such as unicast communications and multicast (broadcast) communications are used.

BACKGROUND OF THE ART

[1] OFDM and Cell Search Processing:

The OFDM modulation scheme uses a guard interval (GI) which is a copy of a part of an effective symbol (effective 20 data) and added to the effective symbol for the purpose of reducing deterioration of characteristics due to delay waves. Since the length of a guard interval added is determined based on an expanse of delay in a propagation path, an embodiment in which multiple guard interval 25 lengths are switched in an operation is proposed.

As an example of such an embodiment, there is a system in which the number of symbols transmitted by subframes of the same length is changed, and the guard interval length is adjusted. In such a system, in a cell with a large radius (hereinafter will be called a large cell) which evolves in the suburbs where few objects executing a shielding effect are present, a subframe format (long GI subframe) having a long guard interval length Ngi_s is used as shown in (2) of FIG. 23, and contrarily, in a cell with a small radius (hereinafter will be called a small cell) which evolves in urban areas where a lot of objects executing a shielding effects are present, a subframe format (short GI subframe) having a short guard interval length Ngi_s is used as shown in (1) of FIG. 23 (for example, see the following non-patent document 6). In this instance, in this FIG. 23, N0 indicates the length of an effective symbol, and one OFDM symbol is formed by one guard interval and one effective symbol.

In cellular systems, it is necessary for mobile stations to perform cell search processing which is an operation of searching a cell with which the mobile station is to establish a radio link. Hereinafter, a description will be made of an example of cell search processing in a case where subframe formats of multiple guard interval lengths exist in a mixed manner thereof.

FIG. 24 shows a construction of a base station transmitter apparatus. The base station transmitter apparatus of FIG. 24 includes, for example: a channel multiplexer 101; a serial/parallel converter 102; an inverse fast Fourier transformer (IFFT) 103; a guard interval inserter 104; a guard interval length controller 105; a radio unit 106; and a transmitter antenna 107. After the channel multiplexer time-division multiplexes a signal (symbol) of a data channel, a signal (symbol) of a pilot channel, a signal (symbol) of a synchronization channel (SCH), and etc., the serial/parallel converter 102 performs serial/parallel conversion of the time-division multiplexed signals to map the converted signals to each subcarrier. The inverse fast Fourier transformer (IFFT) 103 performs IFFT processing, the time-division multiplexed signal thereby being converted into a time domain signal. In this instance, in the following description, signals (symbols) of the above mentioned various channels sometimes will be simply called "so-and-so channels" in a shortened manner. In addition, a pilot channel signal will also be simply called "a pilot signal" or "a pilot".

The time domain signal is input to the guard interval inserter 104, and a guard interval of a length (in FIG. 23, Ngi_s or Ngi_l) determined by the guard interval length controller 105 is inserted to the time domain signal by the guard interval inserter 104. The resultantly obtained signal is then transmitted toward a mobile station as a downlink radio signal by way of the radio unit 106 and the transmitter antenna 107.

FIG. 25 illustrates the construction (format) of a subframe containing seven OFDM symbols per subframe of the above mentioned radio signal. As shown in FIG. 25, the subframe has a construction such that various channels (OFDM symbols) are multiplexed in the two-dimensional direction with time and frequency. That is, a pilot channel shown by the diagonally shaded part 111, a synchronization channel (SCH) indicated by the diagonally shaded part 112, and a data channel indicated by the reference character 113 from which these diagonally shaded parts 111 and 112 are withdrawn, are time-division multiplexed in each subcarrier (frequency) (each row of FIG. 25), a subframe thereby being constructed.

Here, the synchronization channel (SHC) has a common pattern in all the cells, and is time-division multiplexed to the end of a subframe. The pilot channel has a scramble code which is information unique to a cell, and is time-division multiplexed to the head of a subframe. The mobile station is capable of identifying existing cells by means of using such scramble codes. In this instance, the following non-patent documents 1 and 2 also describe a downlink channel construction and cell search processing on the OFDM base.

Subsequently, a cell search processing sequence is shown in FIG. 26. First of all, on the first stage, correlation with the replica of a time signal of the synchronization channel (SCH) which has already been known is detected, and for example, timing indicating the maximum correlation value is assumed to be subframe timing (step S100).

On the second stage, fast Fourier transform (FFT) processing is performed with the subframe timing detected on the first stage (that is, the detected subframe becomes FFT timing) to generate frequency domain signals, and extracts the above mentioned pilot channel from the generated signals. Then, correlation between the extracted pilot channel and the candidate scramble codes (pilot replicas), and for example, a candidate scramble code showing the maximum value is determined to be a detected scramble code (step S200).

In addition, as an example of a previous cell search processing, there is another technique proposed in the following non-patent document 3. This technique is the three-stage fast cell search method using a pilot channel in downlink broadband OFCDM. The technique groups scramble codes beforehand, and detects a scramble code group before scramble code identifying processing. This makes it possible to narrow scramble codes at the time of detecting a scramble code, so that the speed of cell search processing is enhanced.

[2] MBMS:

In 3GPP (3rd Generation Partnership Project), an investigation of a specification of a communications service of a multimedia and broadcast/multicast type (MEMS: Multimedia Broadcast/Multicast Service) has been progressed for standardization of next generation mobile telephone communications services. For example, the following non-patent document 4 proposes the following: the above mentioned long GI subframe is used in MBMS; the short GI subframe is used in unicast communications; a long GI frame in which MBMS data is multiplexed and a short GI subframe is time-division multiplexed (TDM); and MEMS data is frequency-division multiplexed (FDM) in a time-division multiplexed long GI subframe. In this instance, the use of a long GI subframe for multicast communications is also described in the following non-patent document 6.

Further, the following non-patent document 5 proposes a pilot insertion methods as a pilot signal insertion method in MEMS, in which pilot signals are inserted into a narrow time domain in a concentrated manner with an attention paid to Micro Sleep Mode in unicast communications while another pilot insertion method different from that used at the time of unicast communications are used because of the absence of a need for taking a micro sleep mode into consideration. This is considered to be because of the fact that the optimal pilot insertion method is different between unicast communications and multicast communications.

Non-patent Document 1: 3GPP R1-050707, *"Physical Channels and Multiplexing in Evolved UTRA Donwlink"*; NTT DoCoMo, NEC, SHARP; Aug. 29, 2005

Non-patent Document 2: 3GPP R1-051549, *"Cell Search procedure for initial synchronization and neighbour cell identification"*; Nokia; Nov. 7, 2005

Non-patent Document 3: Tanno, Arata, Higuchi, and Sawabashi; *"The Three-stage Fast Cell Search Method Using Pilot Channel in Downlink Broadband OFCDM"*; Technical Report of IEICE, RCS2002-40, CQ2002-40 (2002-04), pp. 135-140

Non-patent Document 4: 3GPP TSG RAN WGI Meeting #43 (R1-051431), *"Multiplexing of Multicast/Broadcast and Unicast Services"*, Huawei, Nov. 7, 2005

Non-patent Document 5: 3 GPP TSG-RAN WG1 #43 (R1-051490) "On Pilot Structure for OFDM based E-Utra Downlink Multicast", QUALCOMM Europe, Nov. 7, 2005

Non-patent Document 6: 3GPP TR 25.814 V0.5.0 (2005-11)

DISCLOSURE OF THE INVENTION

Issues to be Solved by the Present Invention

According to the above cell search processing procedure described in the above item [1], as shown in FIG. 27, on a mobile station, the subframe timing synchronization processor 201 detects subframe timing of a reception signal as processing of the first stage (step S100), and the GI remover 202 removes a guard interval in the reception signal in accordance with the detected subframe timing as processing of the second stage (step S200). Then, the FFT 203 performs FFT processing to extract a pilot channel, and a pilot correlation processor 204 performs arithmetic operation processing of correlation with candidate scramble codes. As a result, a scramble code is detected.

However, in a case where a pilot channel is extracted in the scramble code detecting processing on the second stage by means of FFT processing performed with the subframe timing (FFT timing) detected on the first stage, it can be impossible to perform the FFT processing with the optimal FFT timing since the mobile station does not have information about a guard interval length of a subframe transmitted from the base station (transmitter apparatus).

For example, when two types of subframe formats, a subframe format having a long GI length (hereinafter will be called a long GI subframe) shown in (2) of FIG. 23 and a subframe format having a short GI length (hereinafter will be called a short GI subframe) shown in (1) of FIG. 23, are used in a mixed manner thereof, since the mobile station does not know whether the subframe of a reception signal indicated by the reference character 300 is a long GI subframe or a short GI subframe, it is probable that FFT processing is performed with erroneous timing (time division).

That is, as indicated by the reference character 301 in FIG. 27, in a case where a time division (FFT window shown by the dotted line frame 400) of FFT processing with respect to a short GI subframe is optimized to an effective symbol (pilot symbol) interval, if a reception signal has a long GI subframe, a part of effective symbols (pilot symbols) becomes off the FFT window 400. Thus, resultantly, it becomes impossible to extract a pilot channel correctively. In this instance, contrarily to this, in a case where the FFT window 400 is optimized with respect to a long GI subframe, the result becomes similar to the above.

Because of this, in a system in which subframe formats of different GI lengths are present in a mixed manner thereof, it is necessary that the mobile station performs FFT processing with subframe timing (FFT window 400) optimal to each GI length which is a candidate (that is, each of the subframes of different GI lengths) and performs correlation processing. That is, it is necessary that the GI remover 202, the FFT 203, and the pilot correlation processor 204, shown in FIG. 27, of the number of candidate GI lengths are provided. In this case, the apparatus construction of a mobile station becomes extremely complex.

Thus, the following method is considerable. FFT processing is performed with a subframe having the minimum GI length, out of the candidate GI lengths, as a reference. After correction of the amount of phase rotation due to deviation of FFT timing, pilot correlation processing is performed for each of the subframes of different GI lengths. In this case, however, although only increase in a pilot correlation processing amount is caused, the effect of characteristics improvement in a case of a long GI length cannot be expected. Further, since such increase in the amount of pilot correlation processing leads to enlargement of the number of candidates at the time of scramble code detection processing, an erroneous detection rate thereby being increased, so that characteristics are also deteriorated.

In this instance, according to the technology of the above non-patent document 3, a group code is demodulated with the pilot of the head of a subframe which is adjacent in time domain. In a case where multiple subframes of different GI lengths are present in a mixed manner thereof, however, demodulation must be performed in all the candidate GI lengths by use of pilot channels subjected to FFT processing, so that the amount of processing is increased and the number of candidates at the time of detection is increased, leading to deterioration of characteristics.

In addition, as described in the above item [2], in a case where different pilot insertion methods are respectively applied to unicast communications and multicast/broadcast communication (MBMS), it becomes difficult to detect a scramble method (scramble code) unique to a cell at the time of initial synchronization in unicast communications. That is, when different scramble codes are multiplexed in unicast communications and MBMS, since such different scramble codes cause interference for each other, it is impossible to perform normal averaging in an operation in which correlation values are averaged at the time of scramble code detection in initial synchronization (cell search). This will cause deterioration of a cell search ability.

The present invention is originated in view of the above issues. One object of the present invention is making it possible, even when different pilot (scramble code) insertion methods are respectively used in unicast communications and multicast/broadcast communications (MEMS), to avoid the deterioration of the cell search ability due to interference of the different pilots to each other.

Means to Solve the Issues

In order to accomplish the above object, the present invention may be used for the following radio communications method, transmitter, and receiver.

(1) As a generic aspect, there provided is a radio communications method for use in a radio communications system including: a transmitter; and a receiver being operable to perform radio communications with the transmitter in a plurality of types of communications services, the method comprising: on the transmitter, generating a plurality of kinds of pilot signals corresponding to the plurality of types of communications services; and transmitting at least any one of the plurality of kinds of generated pilot signals using a predetermined band set in a part of a transmission band, and also transmitting the other kinds of pilot signals using the parts of transmission band other than the predetermined band, and on the receiver, detecting a signal in a band containing at least the predetermined band part, out of reception signals from the transmitter; and detecting the pilot signal from the detected signal.

(2) As a preferred aspect, the predetermined band may be a band containing a central part band of the transmission band.

(3) As another more preferred aspect, the predetermined band may be a central part band of the transmission band.

(4) As yet another preferred aspect, the radio communications method may further comprise: on the transmitter, controlling the width of the predetermined band in accordance with the width of the transmission band.

(5) As still another aspect, the radio communications method may further comprise, on the transmitter, performing control such that the wider is the transmission band, the wider is made the predetermined band.

(6) As a further preferred aspect, a pilot signal trans fitted in the predetermined band may be a pilot signal for use in a unicast communications service, and wherein a pilot signal transmitted in a band other than the predetermined band may be a pilot signal for use in a multicast or a broadcast communications service.

(7) As a yet further preferred aspect, a pattern of a pilot signal for use in the unicast communications service may be different from a pattern of a pilot signal for use in a multicast or a broadcast communications service.

(8) As another generic aspect, there provided is a transmitter for use in a radio communications system including: a transmitter; and a receiver being operable to perform radio communications with the transmitter in a plurality of types of communications services, the transmitter comprising: a pilot generating means which generates a plurality of kinds of pilot signals corresponding to the plurality of types of communications services; and a transmitting means which transmits at least any one of the plurality of kinds of generated pilot signals using a predetermined band part set in a part of a transmission band, and transmits the other kinds of pilot signals using parts of the transmission band other than the predetermined band.

(9) As a preferred aspect, the predetermined band may be a band containing a central part band of the transmission band.

(10) As another more preferred aspect, the predetermined band may be a central part band of the transmission band.

(11) As yet another preferred aspect, the pilot generating means may include: a unicast pilot generating unit which generates a first pilot signal for use in a unicast communications service as a pilot signal to be transmitted in the predetermined band part; and a multicast/broadcast generating unit which generates a second pilot signal for use in a multicast or a broadcast communications service as a pilot signal to be transmitted in band parts of the transmission band other than the predetermined band part.

(12) As still another preferred aspect, the unicast pilot generating unit may include a storage unit storing the first pilot signal beforehand, and the multicast/broadcast generating unit includes a storage storing the second pilot signal beforehand.

(13) As a further preferred aspect, a pattern of the first pilot signal may be different from a pattern of the second pilot signal.

(14) As yet another generic aspect, there provided is a receiver for use in a radio communications system including: a transmitter; and a receiver being operable to perform radio communications with the transmitter in a plurality of types of communications services, in which radio communications system the transmitter transmits at least anyone of the plurality of kinds of generated pilot signals corresponding to the plurality of types of communications services using a predetermined band of the transmission band set in a part of a transmission band, and also transmits the other kinds of pilot signals using parts of the transmission band other than the predetermined band, the receiver comprising: a predetermined band signal detecting means which detects a signal in a band containing at least the predetermined band part, out of reception signals from the transmitter; and a pilot detecting means which detects the pilot signal from the signal detected by the predetermined band signal detecting means.

Effects of the Present Invention

According to the present invention, at least any of the following effects and benefits may be obtained.

(1) Since, the receiver detects a signal in the present band and also detects a pilot signal therefrom, it becomes possible to accurately detect a pilot signal even if other pilot signals are frequency-division multiplexed to the same time domain, while avoiding the effect of interference due to such other pilot signals. In consequence, avoidance of deterioration of a cell search ability is enabled on the receiver.

(2) Here, if the predetermined band is provided for a band containing a central band of the transmitter, in particular, for a central band itself, it will bring about an advantage of accurate detection of the above mentioned pilot signal even in a case where the transmitter has different transmission bands, by means of giving a construction in which the receiver end detects at least a signal in the central band. Hence, the necessity of changing the construction and the setting of the receiver end in accordance with the transmission band width of the transmitters is eliminated, so that general versatility is enhanced.

(3) Further, the predetermined band is made to be variable according to the transmission band widths of the transmitter. For example, if the wider is the transmission band width, the wider the predetermined band width is set, it becomes possible to accurately detect a pilot signal with interference due to pilot signals for other communications services being avoided, while assuring multiplexing of data of such other communications services. Furthermore, setting the wider

Figure 1:
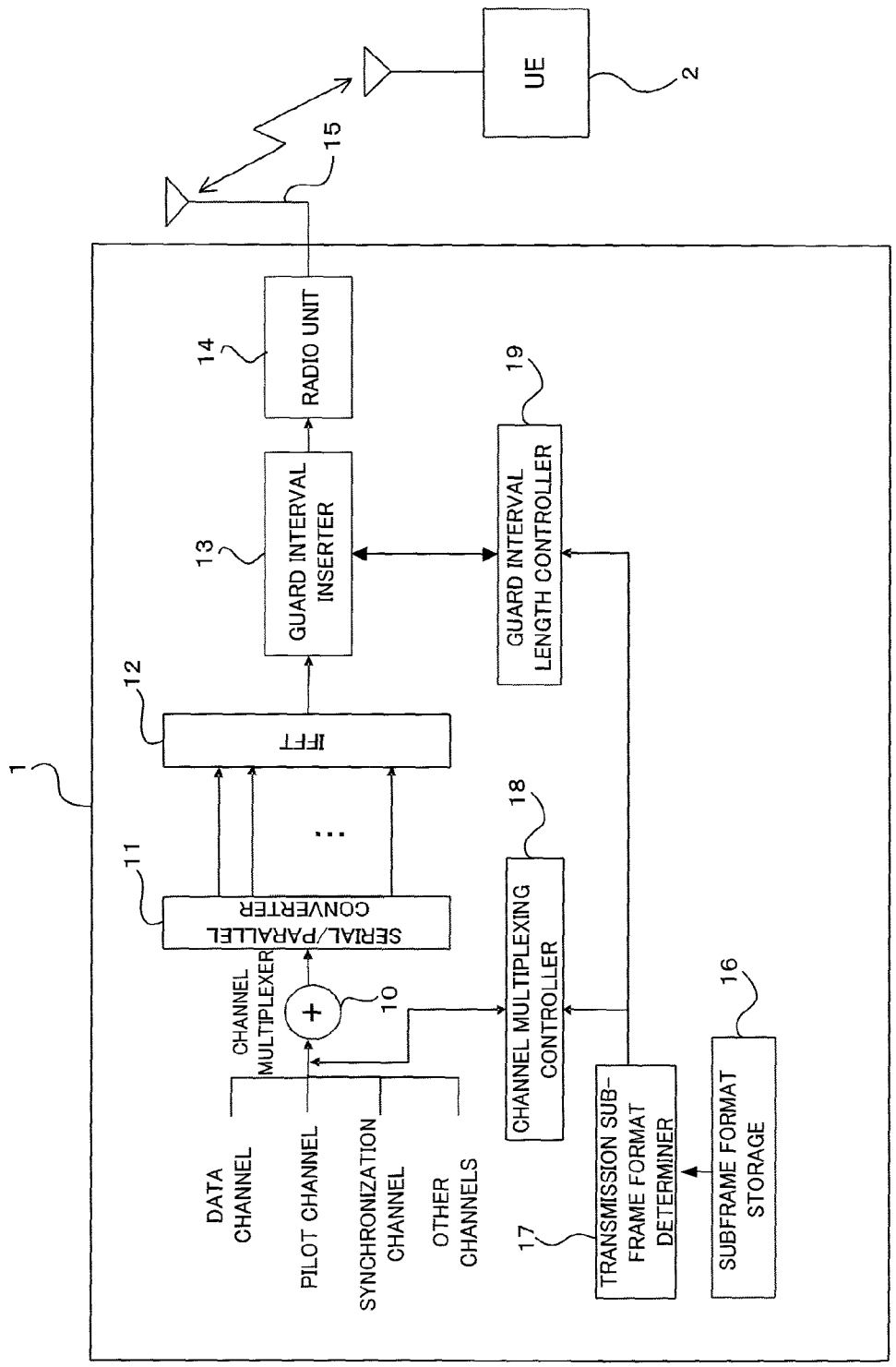
FIG. 1 is a block diagram illustrating a construction of a base station transmitter apparatus according to a first preferred embodiment.

DESCRIPTION OF REFERENCE CHARACTERS 1, 1A . . . base station transmitter apparatus (transmitter)
10 . . . channel multiplexer
11 . . . serial/parallel converter
12 . . . inverse fast Fourier transformation (IFFT) processor
13 . . . guard interval inserter
14 . . . radio unit
15 . . . transmitter antenna
16 . . . subframe format storage
17 . . . transmission subframe format determiner
18 . . . channel multiplexing controller
19 . . . guard interval length controller
19$a$ . . . phase rotation processor
41 . . . unicast pilot generator (storage)
42 . . . multicast (/broadcast) pilot generator (storage)
43 . . . channel multiplexer
43-1, 43-2, 43-3 . . . storage
43-4 . . . sorter
44 . . . IFFT
2 . . . mobile station (UE) (receiver)
20 . . . receiver antenna
21 . . . radio unit
22 . . . first stage processor
22-1 . . . synchronization channel replica signal storage
22-2 . . . correlation processor
22-3 . . . subframe timing detector
23 . . . second stage processor
23-1 . . . GI remover
23-2 . . . FFT
23-3 . . . pilot extractor
23-4 . . . candidate scramble code storage
23-5 . . . pilot correlation processor
23-6 . . . scramble code detector
23-7 . . . pilot/group identification information extractor
23-8 . . . group identification processor
23-9 . . . candidate group code storage 24 ... demodulator
51 ... receiver antenna
52 ... guard interval (GI) remover
54 ... demodulator
55 ... subcarrier extractor
56 ... timing detector
57-1 through 57-L ... correlation arithmetic operator
58-1 through 58-L ... correlation value averager
59 ... determiner
31 ... long GI subframe
32 ... short GI subframe
33 ... central band (unicast pilot predetermined band)
111 ... pilot channel
112 ... synchronization channel (SCH)
113 ... data channel
116 ... broadcasting information channel
118 ... group identification information (S-SCH)
300 ... reception signal
400 ... FFT window

BEST MODE FOR CARRYING OUT THE INVENTION

Figure 23:
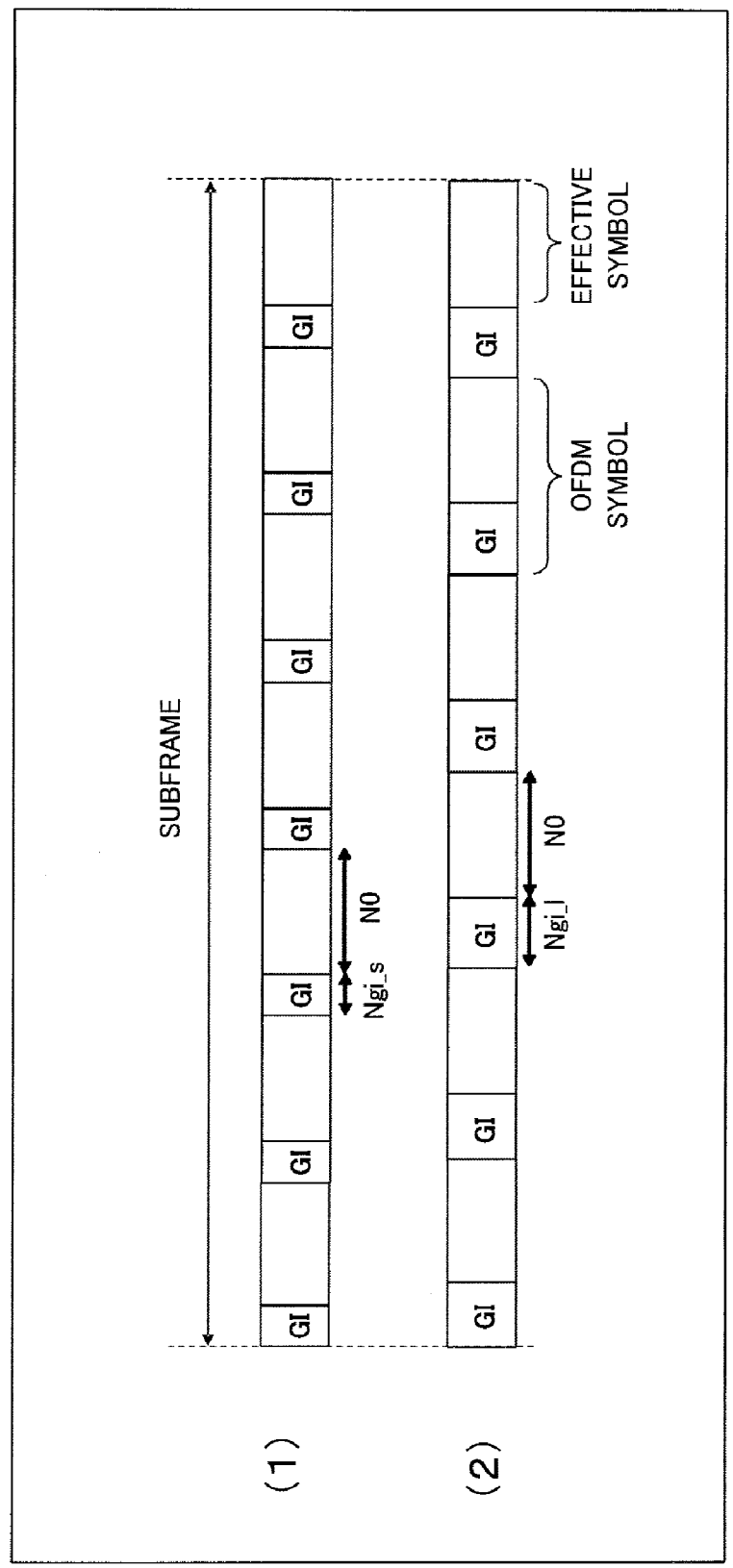
FIG. 23 is a diagram illustrating an example of a subframe format (time domain expression) in a case of employing a previous OFDM modulation scheme.
Figure 24:
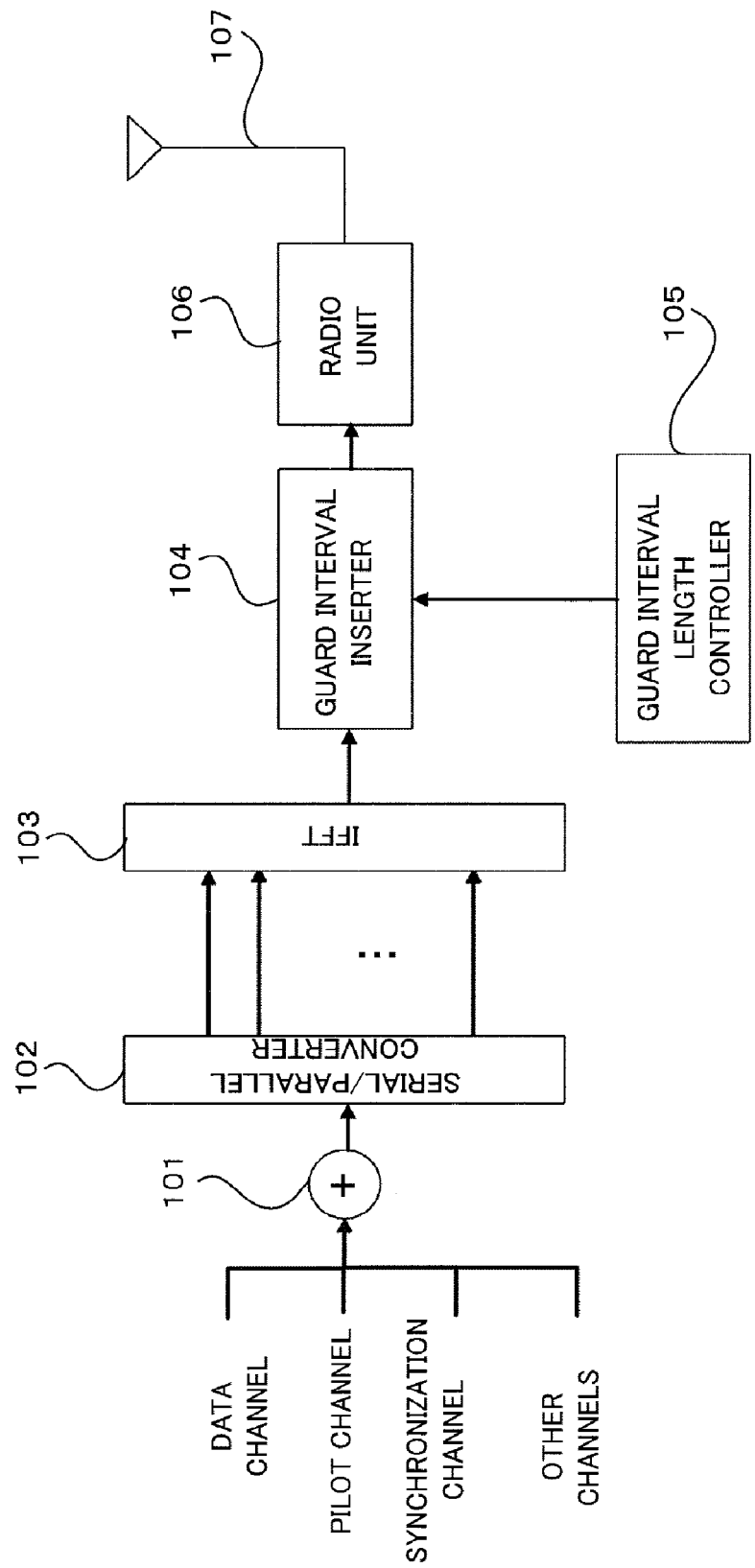
FIG. 24 is a block diagram illustrating a construction of a base station transmitter apparatus employing a previous OFDM modulation scheme.
Figure 25:
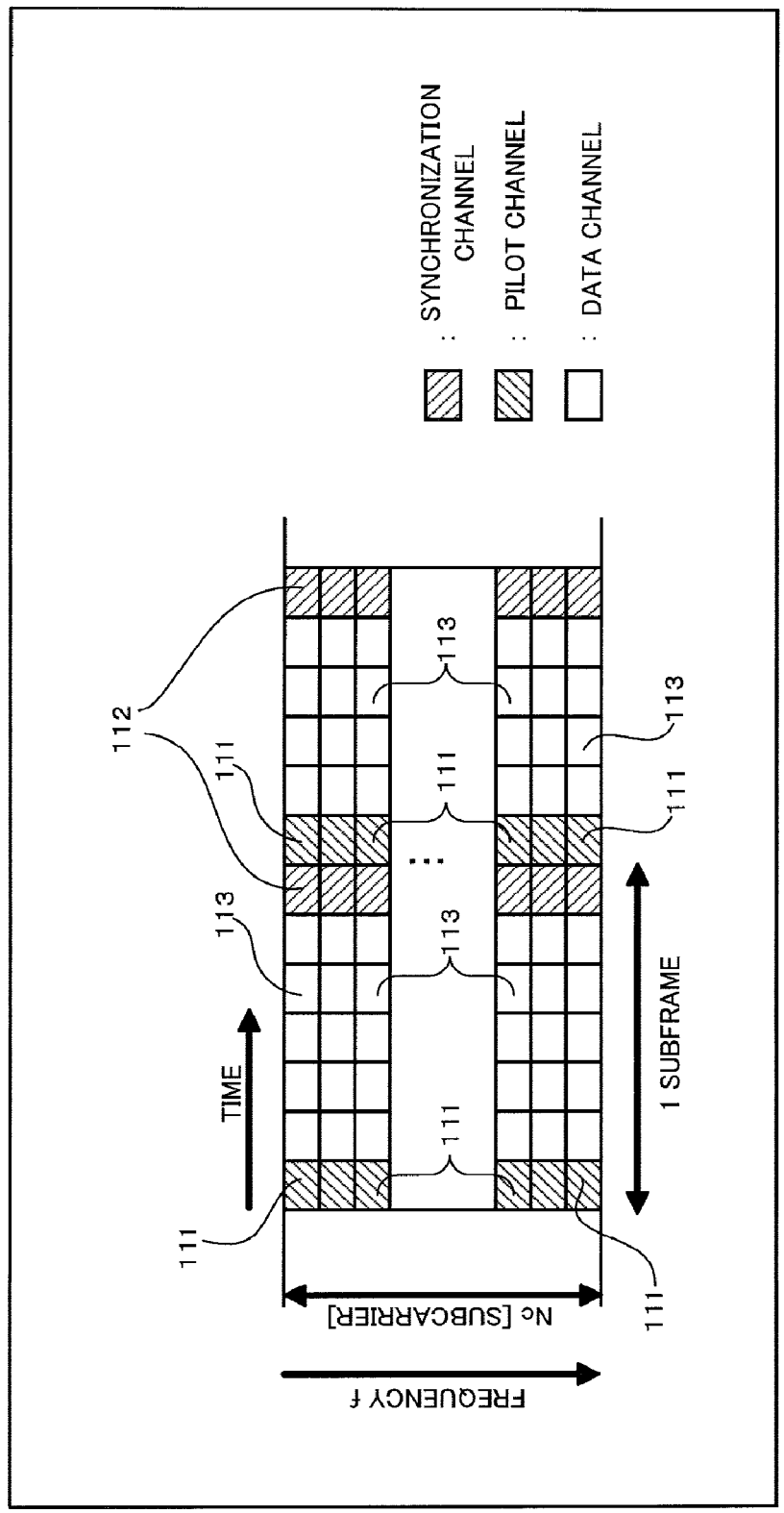
FIG. 25 is a diagram illustrating an example of a subframe format (two-dimensional expression) used by a system employing a previous OFDM modulation scheme.
Figure 26:
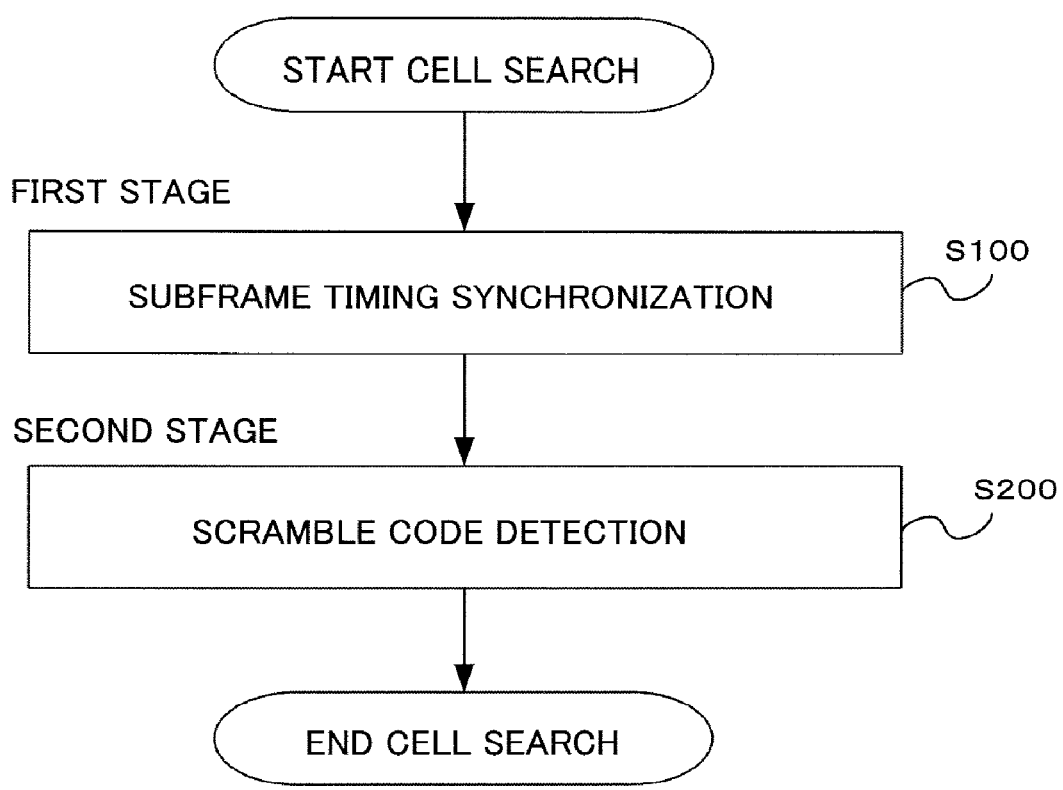
FIG. 26 is a flowchart for describing cell search processing performed on a previous mobile station.
Figure 27:
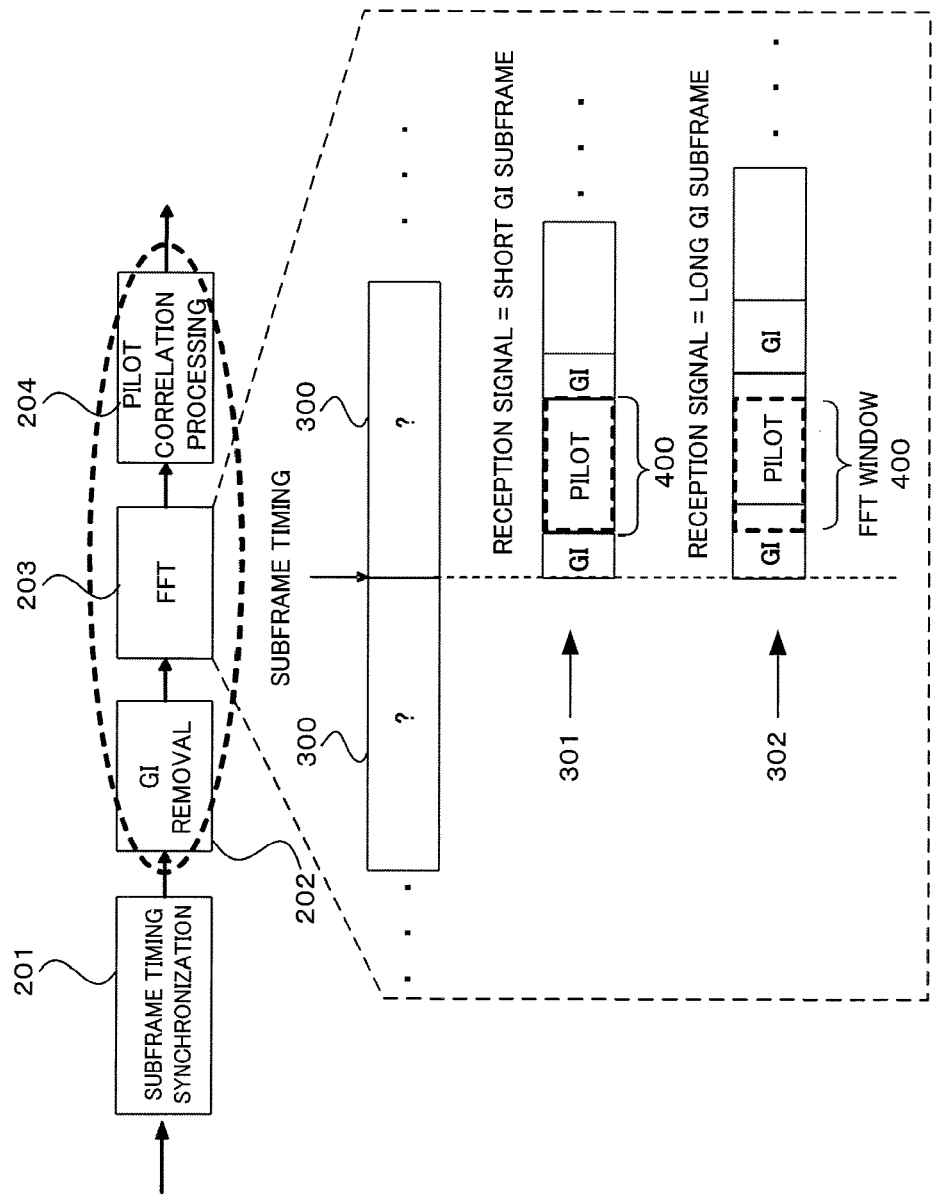
FIG. 27 is a schematic diagram for describing reception processing (FFT processing) at the time of cell search performed on a previous mobile station.

Embodiments will now be described with reference to the relevant accompanying drawings. In this instance, the description will be made taking an example of OFDM communications system in which subframes (short GI subframe and long GI subframe) of two types of guard interval lengths are mixed. In addition, similar to FIG. 23, the number of OFDM symbols contained in a short GI subframe is seven, and the number of OFDM symbols contained in a long GI subframe is six. The length of an effective symbol is N0 in any of the frame formats; the GI length of a short GI subframe is Ngi_s; the GI length of a long subframe is Ngi_l (see, for example, FIG. 5).

A First Embodiment a) Base Station Transmitter Apparatus:

FIG. 1 is a block diagram showing a construction of a base station transmitter apparatus according to a first embodiment. The base station transmitter apparatus 1 in FIG. 1 includes, for example, a channel multiplexer 10, a serial/parallel converter 11, an IFFT 12, a guard interval (GI) inserter 13, a radio unit 14, a transmitter antenna 15, a subframe format storage 16, a transmission subframe format determiner 17; a channel multiplexing controller 18, and a guard interval length controller 19.

Here, the cannel multiplexer 10 time-division multiplexes each channel signal (modulation data) of various types of channels (data channel, pilot channel, synchronization channel, etc.) which is to be transmitted to a mobile station (UE: User Equipment) 2, following control from the channel multiplexing controller 18. The serial/parallel converter 11 (hereinafter will also be referred to as S/P converter) performs serial/parallel conversion of signals (Nc-number of modulation data pieces) time-division multiplexed by the channel multiplexer 10 and then maps each signal to each subcarrier. An IFFT 12 performs IFFT processing of the demodulation data mapped to each subcarrier by the unit of Nc-number of data pieces to convert the data into a time domain signal. The GI inserter 13 follows control from the guard interval length controller 19 to insert a guard interval [of one of the above mentioned two types of GI lengths (Ngi_s and Ngi_l] into the time domain signal.

Figure 5:
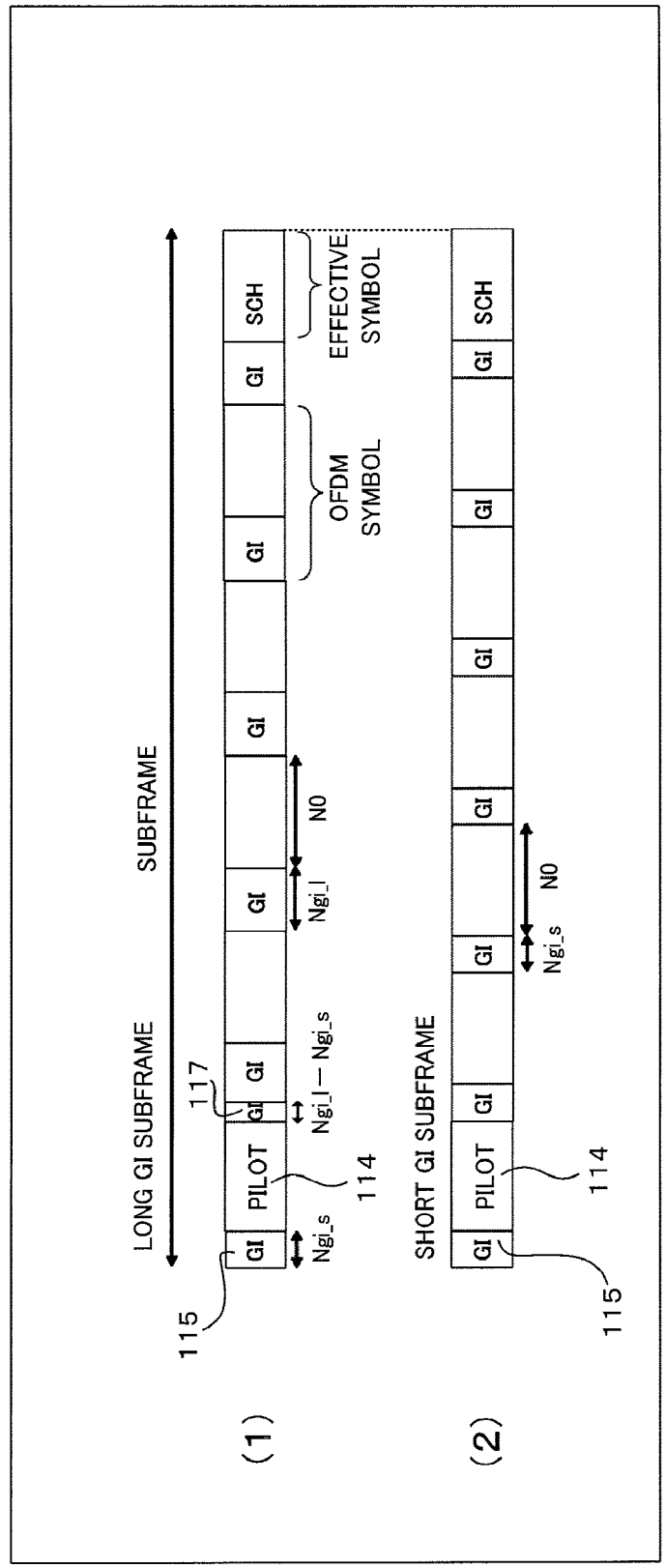
FIG. 5 is a diagram illustrating an example of a subframe format (time domain expression) used by the base station transmitter apparatus in FIG. 1.

Here, in the present example, as shown in, for example, (2) of FIG. 5, as to a short GI subframe, a guard interval of a GI length of Ngi_s is added to the leading symbol to which a pilot channel (a scramble code which is information unique to a cell) is multiplexed to the head of the effective symbol. As to a long GI subframe, as shown in (1) of FIG. 5, a guard interval equal to the minimum GI length Ngi_s is added to a leading symbol, to which a pilot channel is multiplexed, the head of the effective symbol (see reference character 115), and a guard interval equal to a difference (Ngi_l−Ngi_s) between the maximum GI length Ngi_l and the minimum GI length Ngi_s is added to the end of the effective symbol (see reference character 117). Such guard interval insertion processing is controlled by the guard interval length controller 19.

The radio unit 14 performs radio processing such as frequency conversion (up conversion) of the short GI subframe or the long GI subframe after guard interval insertion thereto into a predetermined radio frequency, and the thus obtained radio signals are transmitted to a propagation path by way of the transmitter antenna 15.

The subframe format storage 16 stores information used at the time of constructing (forming) transmission subframes, such as information relating to the type of subframe format to be transmitted (in the present example, information specifying whether the subject frame is a short GI subframe or a long GI subframe), the number of transmission symbols (Nsf) per subframe with respect to each subframe, the GI length (Ngi_s and Ng_l) of each subframe, or the like.

The transmission subframe format determiner 17 determines a subframe format (short GI subframe format or long GI subframe format) to be transmitted, and reads information used for forming the determined subframe format from the subframe format storage 16, and then gives instructions to the channel multiplexing controller 18 and the guard interval length controller 19.

The channel multiplexing controller 18 controls time-division multiplexing of the above mentioned each cannel signal (modulation data) performed by the channel multiplexer 10, following the above mentioned instruction from the transmission subframe format determiner 17. The channel multiplexing controller 18 performs control in such a manner that Nc-number of signals of each channel per 1 OFDM symbol are input to the channel multiplexer 10 in a predetermined time sequence. For this purpose, the channel multiplexing controller 18 has an internal counter (not illustrated) for counting the number (Nsf) of OFDM symbols per subframe.

Then, the guard interval length controller 19 controls guard interval insertion processing performed by the GI inserter 13. As already described, as to a short GI subframe, the guard interval length controller 19 adds a guard interval of a GI length Ngi_s to the head of an effective symbol (see reference character 115) as shown in (2) of FIG. 5. As to a long GI subframe, the guard interval length controller 19 adds a guard interval of a length equal to a length of the minimum GI length Ngi_s to the head of an effective symbol (see reference character 115). Further, the guard interval length controller 19 controls guard interval insertion processing in such a manner that a guard interval equal to a difference (Ngi_l−Ngi_s) between the maximum GI length Ngi_l and the minimum GI length Ngi_s to the end of the effective symbol (see reference character 117).

Hereinafter, a detailed description will be made of an operation (transmission processing) of the base station transmitter apparatus 1 (hereinafter also will be simply called "base station 1") having the above described construction of the present embodiment.

Figure 2:
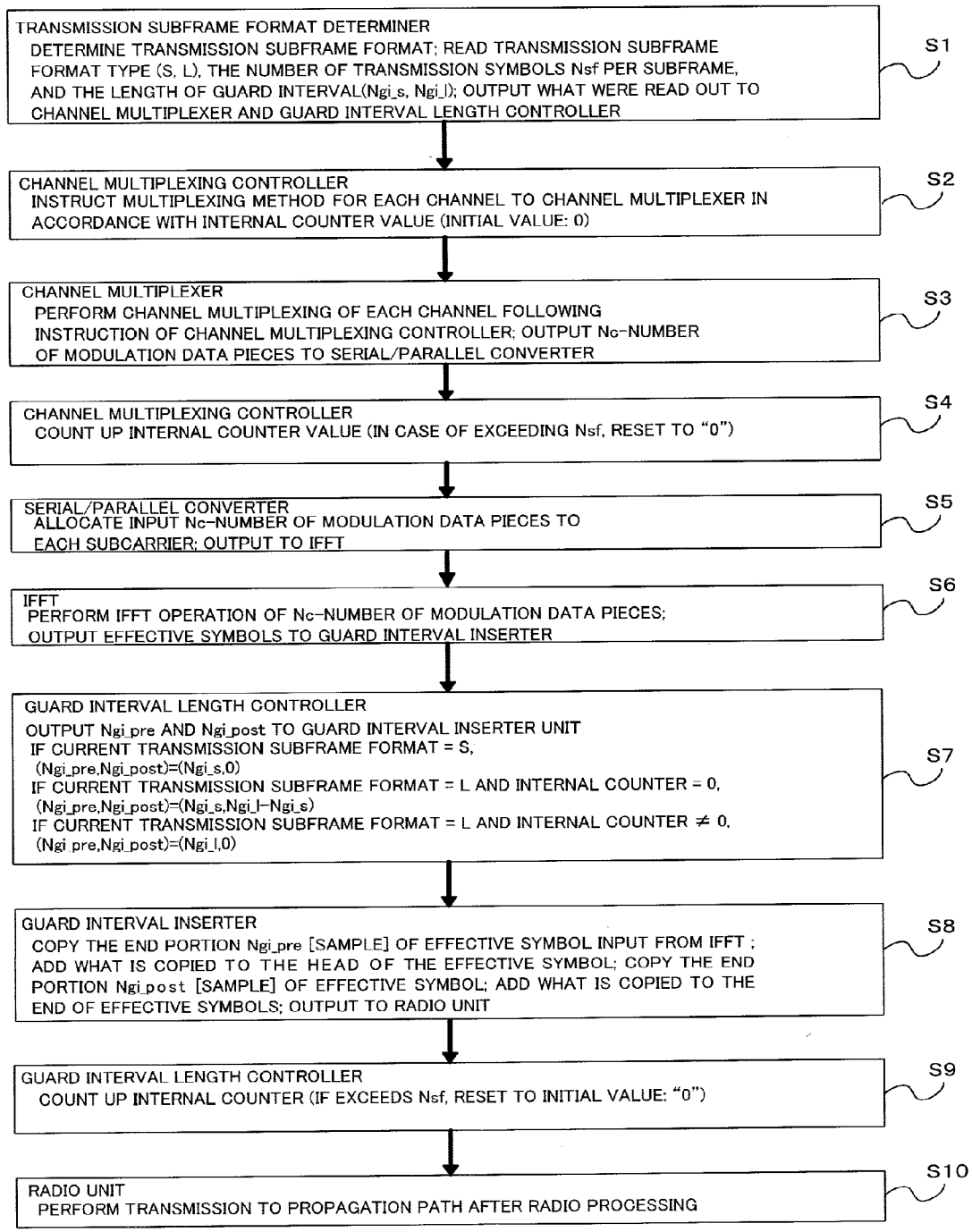
FIG. 2 is a flowchart for describing an operation (transmission processing) on the base station transmitter apparatus shown in FIG. 1.
Figure 3:
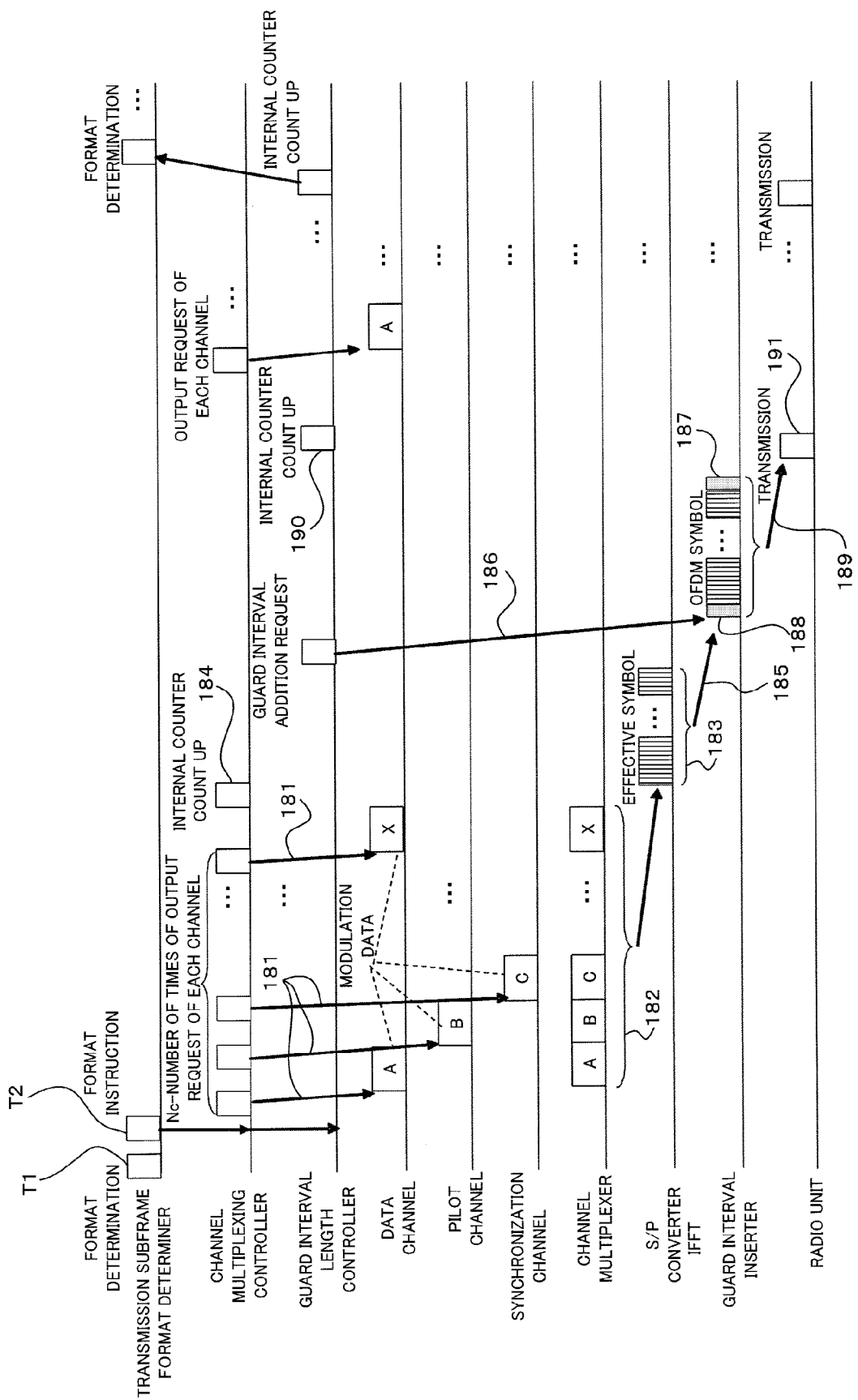
FIG. 3 is a timing chart for describing an operation (transmission processing) on the base station transmitter apparatus shown in FIG. 1.

On the base station 1, the transmission subframe format determiner 17 determines a transmission subframe format (see timing T1 in FIG. 3), and reads the type of subframe format (S and L), the number Nsf of transmission symbols per subframe, and the guard interval length (Ngi_s and Ngi_l) from the subframe format storage 16, and then outputs (instructs) what are read out to the channel multiplexing controller 18 and the guard interval length controller 19 (see step S1 of FIG. 2 and timing T2 of FIG. 3). In this instance, S of the above transmission subframe format types (S and L) means a short GI subframe format; L of the above transmission subframe format types means a long GI subframe format.

As a result, the channel multiplexing controller 18 instructs the channel multiplexer 10 of the multiplexing method for each channel in accordance with the value of the inner counter (initial value: "0") (step S2 of FIG. 2). At that time, as shown in FIG. 3, the guard interval length controller 19 outputs an output request for each channel signal only Nc-number of times (the number of subcarriers), thereby inputting modulation data (A, B, C, . . . ) of Nc-number of channels to the channel multiplexer (see arrow 181), following the above described instruction in a predetermined sequence.

The channel multiplexer 10 performs time-division multiplexing of demodulation data pieces (Nc-number of data pieces) of each channel (see reference character 182 in FIG. 3), and then outputs Nc-number of demodulation data pieces to the S/P converter 11 (see step S3 in FIG. 2 and the arrow 183 in FIG. 3).

In this instance, the channel multiplexing controller 18 counts up the value of internal counter upon an input of Nc-number of modulation data pieces (A, B, C, . . . ) of each channel as described above. Here, if such counting up makes the value exceed Nsf, the channel multiplexing controller 18 resets the value to "0" (see step S4 of FIG. 2 and the reference character 184 of FIG. 3). In this instance, Nsf means an upper limitation value of the number of OFDM symbols. The number of OFDM symbols in a case of short GI subframe is seven, and the number of OFDM symbols in a case of long GI subframe is six, as described above.

On the other hand, the serial/parallel converter 11 converts time-division multiplexed signals (Nc-number of modulation data pieces) input from the channel multiplexer 10, and maps them to each subcarrier, and then outputs them to the IFFT 12 (step S5 of FIG. 2). The IFFT 12 performs an IFFT operation to Nc-number of modulation data pieces mapped to each subcarrier, and outputs effective symbols to the guard interval inserter 13 (see step S6 of FIG. 2 and arrow 185 of FIG. 3).

Then, the guard interval length controller 19 outputs a guard interval length (Ngi_pre) to be added before an effective symbol and a guard interval length (Ngi_post) to be added after the effective symbol, as a guard interval addition request, to the guard interval inserter 13 (see the arrow 186 of FIG. 3).

Here, it is assumed that in a case where the current (determined by the transmission subframe format determiner 17) transmission subframe (format) is a short GI subframe (S), (Ngi_pre, Ngi_post)=(Ngi_s, 0), and that in a case where the current transmission subframe is a long GI subframe (L), (Nig_pre, Ngi_post)=(Ngi_s, Ngi_l−Ngi_s). In this instance, if the current transmission subframe (format) is a long GI subframe with an internal counter value other than "0" (that is, in a case where an effective symbol which is a subject of GI insertion is not the head of subframe), (Ngi_pre, Ngi_post)= (Ngi_l, 0), and insertion of a guard interval before the effective symbol is instructed (see step S7 of FIG. 2).

Upon reception of the above mentioned instruction (guard interval addition request), the guard interval inserter 13 copies the end portion Ngi_pre [sample] of the effective symbol input from the IFFT 12, and adds what is copied before the effective symbol (see the reference character 187 of FIG. 3).

The guard interval inserter 13 also copies the front portion Ngi_post [ sample], and adds what is copied to the end of the effective symbol (see reference character 188 of FIG. 3), and then output the effective symbol to the radio unit 14 (see step S8 and the arrow 189 of FIG. 3).

After that, the guard interval length controller 19 counts up the internal counter (if exceeds Nsf, the value is reset to the initial value of "0") (see step S9 of FIG. 2 and the reference character 190 of FIG. 3).

On the other hand, the radio unit 14 performs necessary radio processing, such as up conversion processing, onto the OFDM symbols from the guard interval inserter 13, and then transmits the thus obtained transmission radio signals from the transmitter antenna 15 to a propagation path (see step S10 of FIG. 2 and the reference character 191 of FIG. 3).

Figure 4:
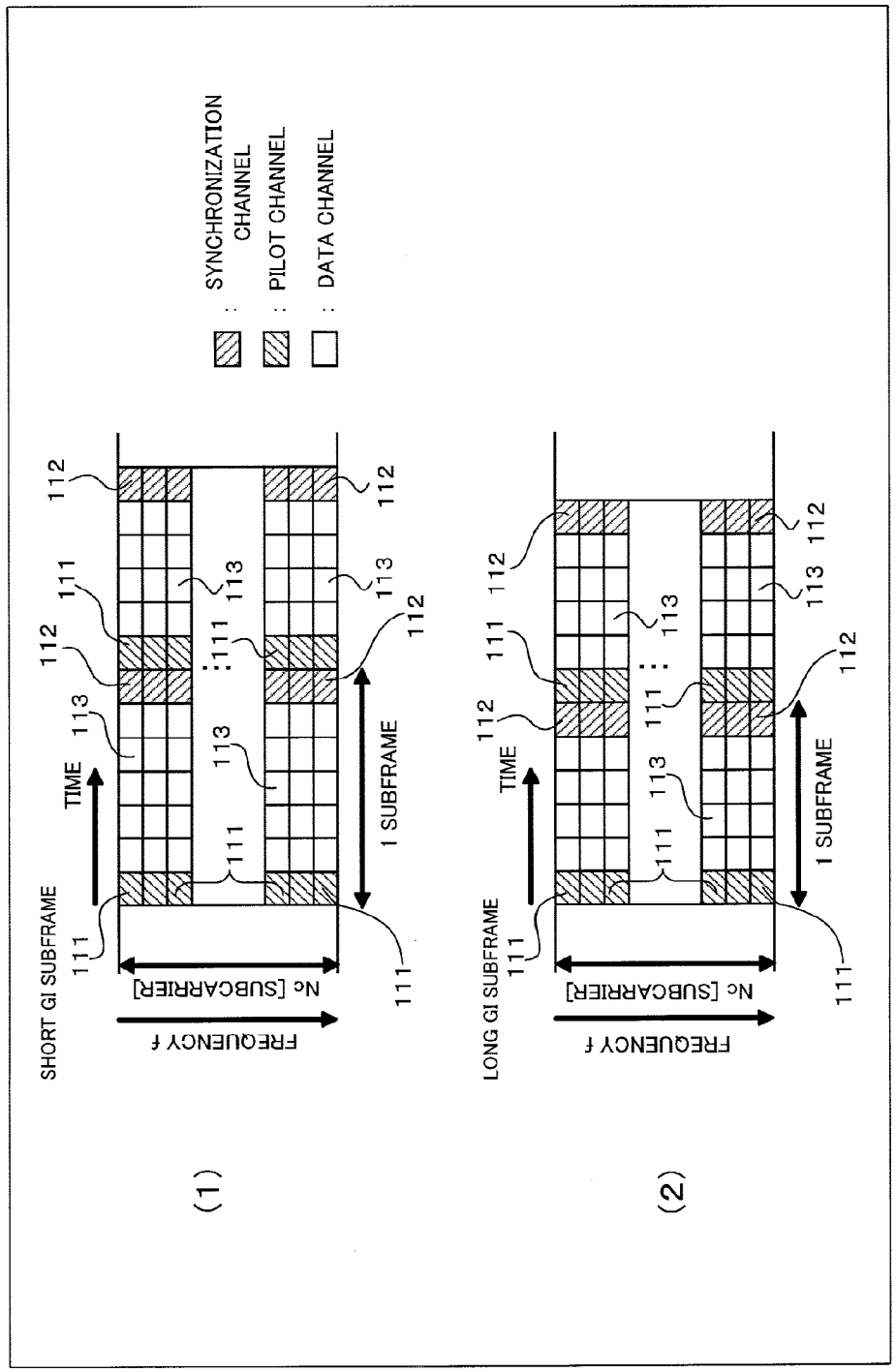
FIG. 4 is a diagram illustrating an example of a subframe format (two-dimensional expression) used by the base station transmitter apparatus shown in FIG. 1.

Thereafter, the processing already described is repeated, downlink radio signals thereby being transmitted in the short GI subframe format shown in (1) of FIG. 4 and (2) of FIG. 5 or in the long GI subframe format shown in (2) of FIG. 4 and (1) of FIG. 5. In this instance, both of (1) and (2) of FIG. 4 express the subframe formats in two-dimensional allocation with time and the subcarrier (frequency); both of (1) and (2) of FIG. 5 express the subframe format in the time domain.

In other words, as understandable from (1) and (2) of FIG. 4, in any case of the formats, a short GI subframe and a long GI subframe, in each subcarrier, a pilot channel (see the diagonally shaded area 111) is allocated (time-division multiplexed), and a data channel (see the reference character 113) is then allocated. After that, downlink radio transmission signals are transmitted in a subframe format in which a synchronization channel (SCH) (see the diagonally shaded area 112) allocated at the end of the subframe. Further, as understandable from (1) and (2) of FIG. 5, at least a guard interval (GI: see the reference character 115) of a fixed GI length (Ngi_s) is always inserted before an effective symbol (pilot channel: see the reference character 114) which is multiplexed to the head of a subframe, regardless of whether the subject subframe is a short GI subframe or a long GI subframe, and the above described radio transmission signals are transmitted. In this instance, as to effective symbols other than that of the head of a subframe, a guard interval of an original GI length Ngi_s or Ngi_l is inserted before each effective symbol.

Accordingly, as explained hereinbelow, the mobile station (receiver) 2, if it does not know whether the subframe format of a reception signal has a short GI subframe or a long GI subframe, sets the beginning position of an FFT window to after the time corresponding to the above fixed GI length from the leading timing of the subframe, and then begins FFT processing, thereby making it possible to perform FFT processing in an appropriate time division with respect to at least the leading symbol (pilot symbol), so that pilot channel extraction and scramble code detection afterward will be able to be performed appropriately.

b) Mobile Station:

Next, a description will be made hereinafter of the construction of a mobile station 2 and its operation.

Figure 6:
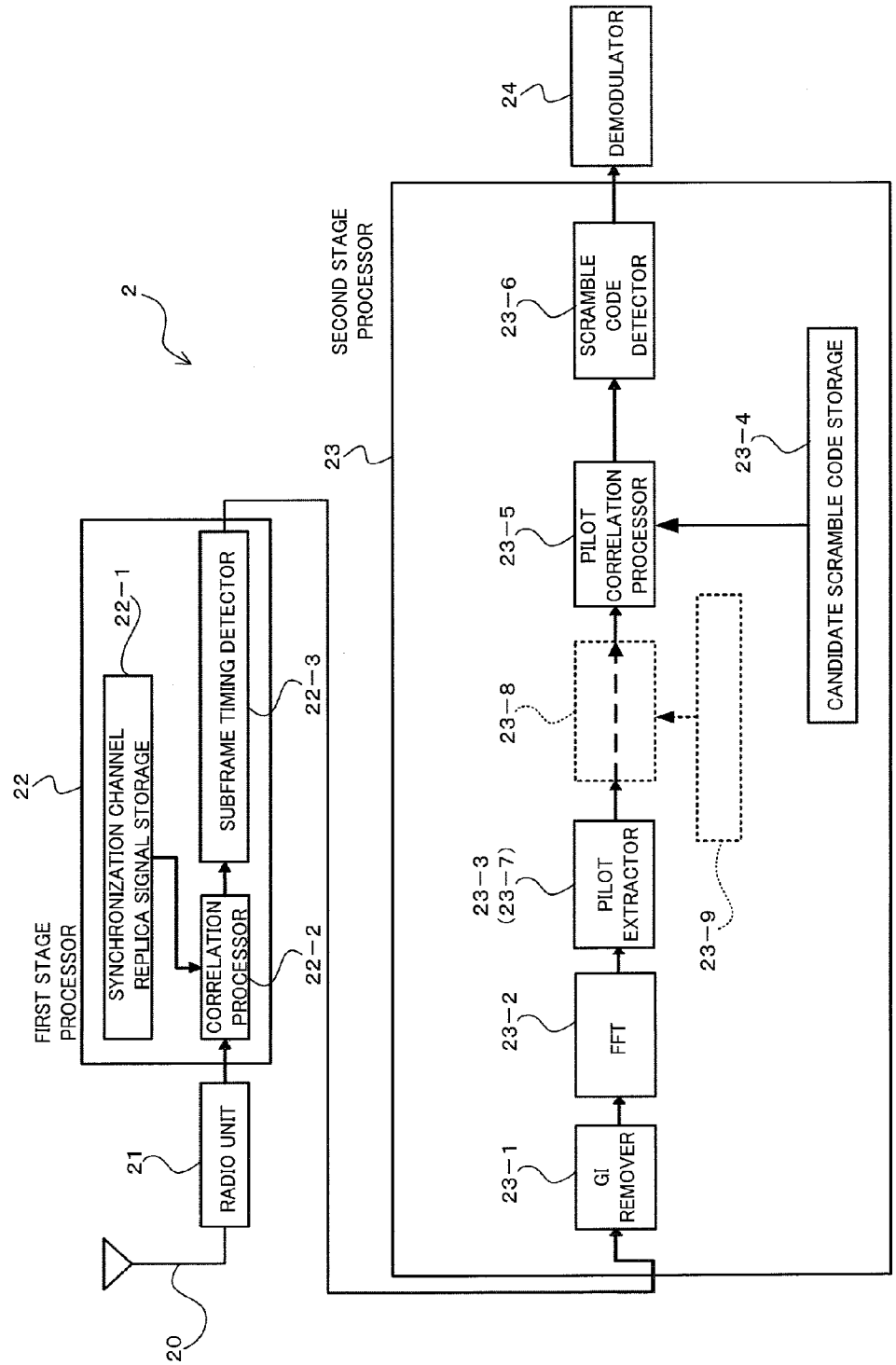
FIG. 6 is a block diagram illustrating a construction of a mobile station shown in FIG. 1.
Figure 7:
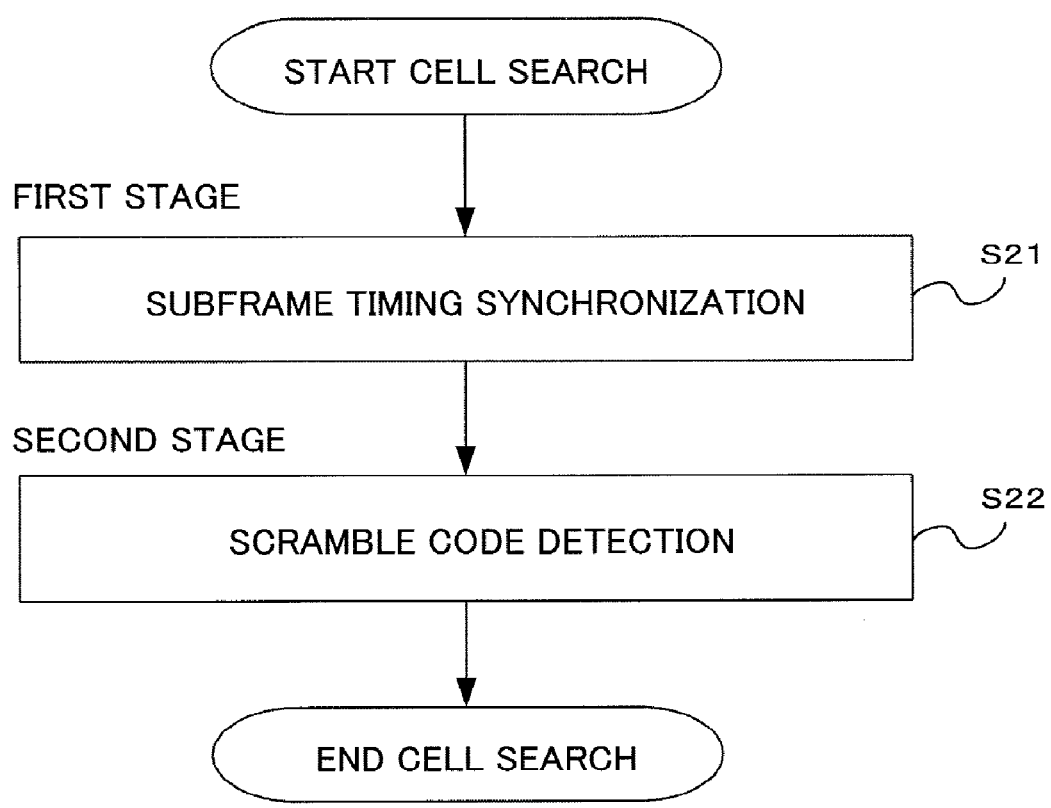
FIG. 7 is a flowchart for describing cell search processing performed on the mobile station shown in FIG. 6.

FIG. 6 is a block diagram illustrating the construction of a mobile station in the 0 FDM communications system. The mobile station 2 of FIG. 6 includes, for example: a first stage processor having, for example, a receiver antenna 20, a first stage processor 22 with a synchronization channel replica signal storage 22-1, a correlation processor 22-2, and a subframe timing detector 22-3; a second stage processor 23 having a GI remover 23-1, an FFT 23-2, a pilot extractor 23-3, a candidate scramble code storage 23-4, a pilot correlation processor 23-5, and a scramble code detector 23-6; and a demodulator 24.

Here, the receiver antenna 20 receives a radio signal from the base station 1. The radio unit 21 performs radio reception processing such as down conversion of the radio signal received by the receiver antenna 20. The first stage processor 22 detects subframe timing based on a correlation between a reception signal from the radio unit 21 and a replica signal of the synchronization channel (SCH), which is a known pattern, as the first stage processing of cell search.

Thus, in the first stage processor 22, the synchronization channel replica signal storage 22-1 stores replica signals of the synchronization channel beforehand; the correlation processor 22-2 obtains a correlation between the above reception signal and the replica signals stored in the synchronization channel replica signal storage 22-1. The subframe timing detector 22-3 detects the subframe timing of the reception signal based on result s of correlation processing performed by the correlation processor 22-2. For example, it is possible to detect timing with which the largest correlation is shown as subframe timing.

Further, the second stage processor 23 performs fast Fourier transform (FFT) processing based on the subframe timing detected by the first stage processor 22 to extract a pilot channel and detect a scramble code.

Hence, in the second stage processor 23, the GI remover 23-1 removes a guard interval inserted into a reception signal based on the subframe timing detected by the subframe timing detector 22-3. Here, in the present example, as already described, on the base station 1, at least a guard interval of a fixed GI length (Ngi_s) is always inserted before an effective symbol of the head of a transmission subframe, regardless of whether it is a short GI subframe or a long GI subframe, so that a guard interval of the fixed GI length of at least the head of the subframe is removed.

The FFT 23-2 performs FFT processing to the effective symbol whose guard interval has been removed in a predetermined time division (at least effective symbol length time), that is, in an FFT window, thereby converting a time domain reception signal into a frequency domain signal. In the present example, as already described, the FFT 23-2 sets the start position of an FFT window after a lapse of the time corresponding to the fixed GI length (Ngi_s) from subframe timing before starting FFT processing, so that it is possible to always perform FFT processing at appropriate time divisions regardless of whether the subframe is a short GI subframe or a long GI subframe.

The pilot extractor 23-3 extracts a pilot channel signal (pilot symbol) from the frequency domain signal after being subjected to FFT processing performed by the FFT 23-2. The candidate scramble code storage 23-4 stores candidate scramble codes (pilot replicas) for use in correlation processing by the pilot correlation processor 23-5. The pilot correlation processor 23-5 obtains correlation between the pilot symbol extracted by the pilot extractor 23-3 and the candidate scramble codes stored in the candidate scramble code storage 23-4.

The scramble code detector 23-6 detects a scramble code based on correlation processing results in the pilot correlation processor 23-5. For example, a candidate scramble code which shows the largest correlation can be made to be a detected scramble code.

Then, the demodulator 24 performs inverse dispersion processing using a scramble code detected by the scramble code detector 23-6 and reception signal demodulation processing including FFT processing of effective symbols. In this instance, in the present example, the GI length before the effective symbol of the head of a subframe is fixed, not dependent on the difference of subframe formats having different GI lengths. Because of this, the GI length can become longer than the original GI length, causing the possibility of characteristics deterioration due to delay waves. However, this issue can be avoided by means of performing processing described below with reference to FIG. 9 at the demodulator 24.

Hereinafter, a description will be made an operation (cell search method) of a mobile station 2 according to the present embodiment with the above described construction.

In the present example, also, the mobile station 2 detects correlation with the replica of a time signal of a synchronization channel (SCH), which is a known pattern, and, for example, the timing indicating the largest correlation value is employed as subframe timing (step S21).

That is, on the mobile station 2, the receiver antenna 21 receives a radio signal from the base station 1, and the radio unit 21 performs the radio processing such as down conversion or the like. After that, on the first stage processor 22, the correlation processor 22-2 obtains correlation of the reception signal with the replica signals of the synchronization channel (SCH) stored in the synchronization channel replica signal storage 22-1, and the subframe timing detector 22-3 detects timing with which the result (correlation value) becomes the largest value as subframe timing.

Then, in the second stage processor 23, the GI remover 23-1 removes Nig_s [sample] of the reception signal based on the subframe timing detected by the subframe timing detector 22-3 regardless of a subframe format of a signal currently being received, as described above, and the FFT 23-2 performs FFT processing to execute conversion of the signal into a frequency domain signal.

In this manner, according to the present example, when FFT processing of a symbol of the head of a subframe is performed, a guard interval of Ngi_s [sample] is always removed from subframe timing regardless of difference between subframe formats of reception signals (whether the subject subframe is a short GI subframe or a long GI subframe, so that it is always possible to perform FFT processing in an appropriate time division (FFT window) without causing sample deviation.

Figure 8:
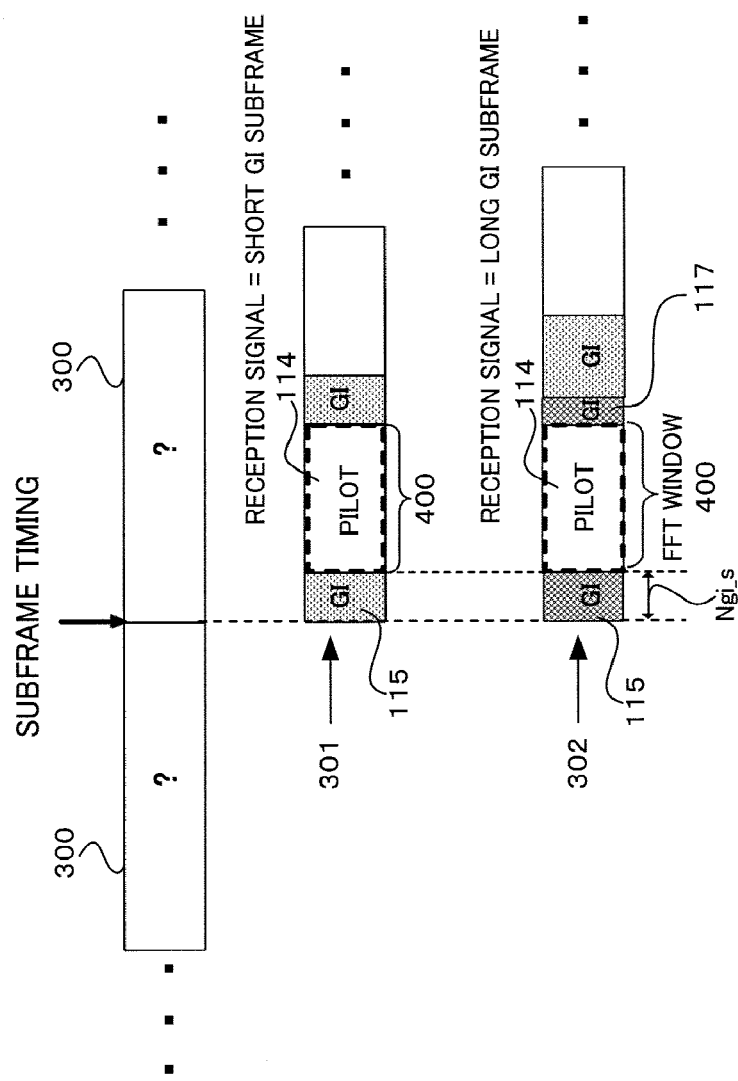
FIG. 8 is a schematic diagram for describing an operation of an FFT of the mobile station shown in FIG. 6.

That is, as shown in FIG. 8, even when it is impossible to distinguish whether the subframe format of a reception signal (see the reference character 300) is a short GI subframe format or a long GI subframe format, and even when the time division (FFT window shown with the dotted line block 400) of FFT processing to a short GI subframe is optimized with respect to an effective symbol (pilot symbol) interval, if the reception signal 300 is a long GI subframe (see the reference character 302), a guard interval of a GI length Ngi_s being the same as that in a case of a short GI subframe is inserted, so that it is possible to perform FFT processing without causing sample deviation of the effective symbol (pilot symbol) in the same FFT window 400.

Here, the reception signal after being subjected to FFT processing is input to the pilot extractor 23-3, and the pilot extractor 23-3 extracts a pilot symbol from a subcarrier to which a pilot channel has been multiplexed. After that, the pilot correlation processor 23-5 obtains correlation between the extracted pilot symbol and candidate scramble codes stored in the candidate scramble code storage 23-4, and then, the scramble code detector 23-6 makes a candidate scramble code obtaining the maximum correlation value be the detected scramble code (step S22).

Figure 9:
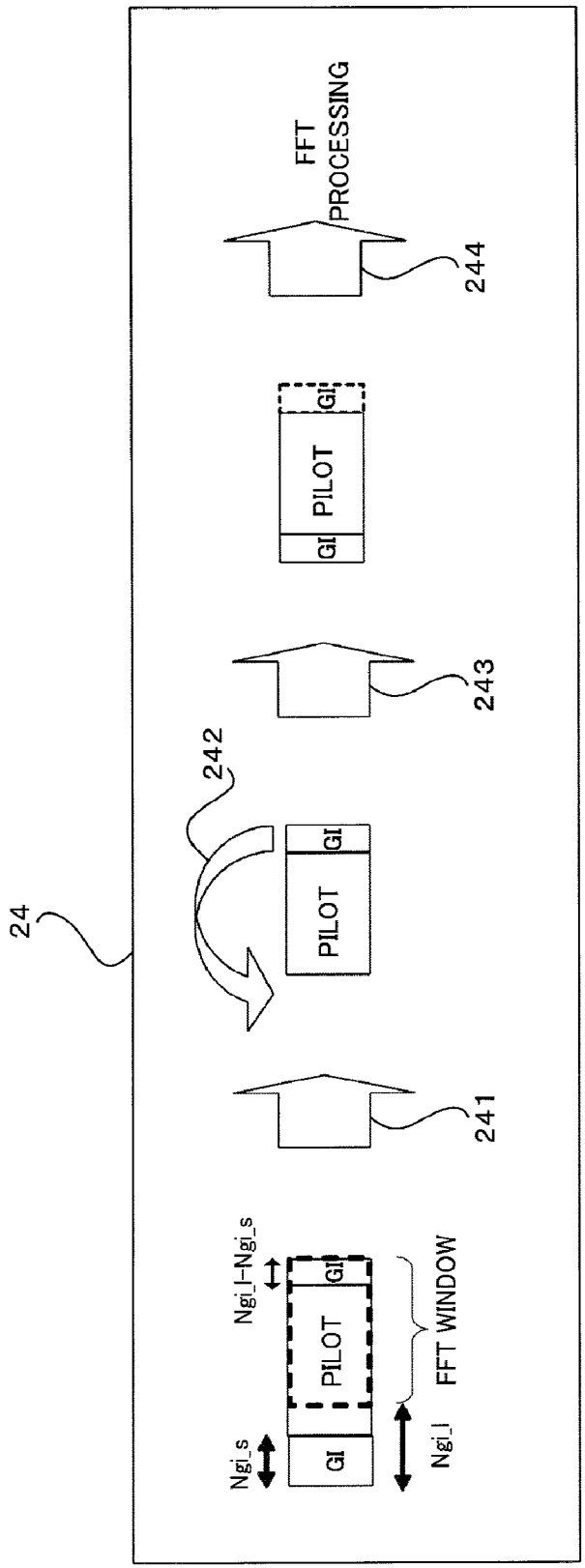
FIG. 9 is a schematic diagram for describing an operation of a demodulator of the mobile station shown in FIG. 6.

In this instance, the detected scramble code is used in demodulation processing by the demodulator 24 after radio link established. Here, as schematically shown in FIG. 9, in demodulation processing of the effective symbol (pilot symbol) of the head of a long GI subframe by the demodulator 24, after radio link coupling, only the leading portion of a GI length Ngi_l [sample] of the long GI subframe is removed (see the arrow 241), and the end portion of a GI length Ngi_l–Ngi_s [sample] of the symbol is moved (cut & paste) before the symbol (see the arrows 242 and 243), and then, the above-described FFT processing is performed (see the arrow 244).

Hereby, even if the length of a guard interval which is added before the leading symbol of a long GI subframe on the base station 1 end is shorter than the original length (Ngi_l), the effect (characteristics deterioration reduction effect due to a delay wave) is not resultantly different from a symbol to which a long GI subframe of an original GI length (Ngi_l) is added.

As described above, according to the present embodiment, in FFT processing performed upon detection of a scramble code on the second stage of cell search by the mobile station 2, it is always possible to perform FFT processing in an appropriate time division (FFT window), without causing sample deviation, by means of removing a guard interval of Ngi_s [sample] from subframe timing regardless of difference of the subframe format of reception signals (whether they have a short GI subframe or a long GI subframe). In consequence, appropriate pilot channel extracting processing and scramble code detection processing can be realized.

Accordingly, even in a case where subframe formats of multiple guard interval lengths are present in a mixed condition thereof, it is possible to realize appropriate cell search processing without causing increase in the scale or the complexity of the construction of the mobile station 2, so that the mobile station 2 can be simplified and characteristics at the time of cell search processing can be improved. In addition, since the number of candidates in the scramble code detector 23-6 does not (is not necessary to) increase, an erroneous detection rate due to increase in the number of candidates is able to be restrained, and characteristics improvement can be expected.

In this instance, although guard intervals are controlled to be mapped in such a manner that the positions of beginning of the effective data of the subframe symbols are apart from frame timing by the same amount in the above described case, guard interval mapping can also be performed in such a manner that the positions of beginning of effective data from subframe timing are apart from frame timing by the same amount. For example, a guard interval can be mapped in such a manner that the effective data beginning position of the third symbol and that of the second symbol are apart from frame timing by the same amount. In such a case, pilots are multiplexed to the effective data whose effective data beginning positions are apart from frame timing by the same amount.

B Second Embodiment

The mobile station 2 receives broadcasting information (transmitted from the base station 1 in cyclic through a broadcasting information channel) containing information unique to a cell after detection of a scramble code of the above mentioned base station 1. In the already described first embodiment, it is possible to perform FFT processing in an appropriate time division to detect a scramble code, regardless of difference in the length of a guard interval inserted into a subframe which is being received. However, information (as to which GI length the subframe has) about subframes being received is sill unknown. Thus, at the time broadcasting information is demodulated, all the candidate GI lengths (Ngi_s and Ngi_l) are necessary to be subjected to processing.

According to the first embodiment, only information (pilot channel) identifying a cell is allocated at the head of a subframe. However, generally speaking, it is sufficient to insert a pilot channel (symbol) at the rate such that the channel estimation accuracy at the time of demodulation processing is secured sufficiently. Here, for example, it is assumed that pilot symbol insertion at 1 subcarrier intervals can realize the sufficient channel estimation accuracy at the time of demodulation.

Figure 10:
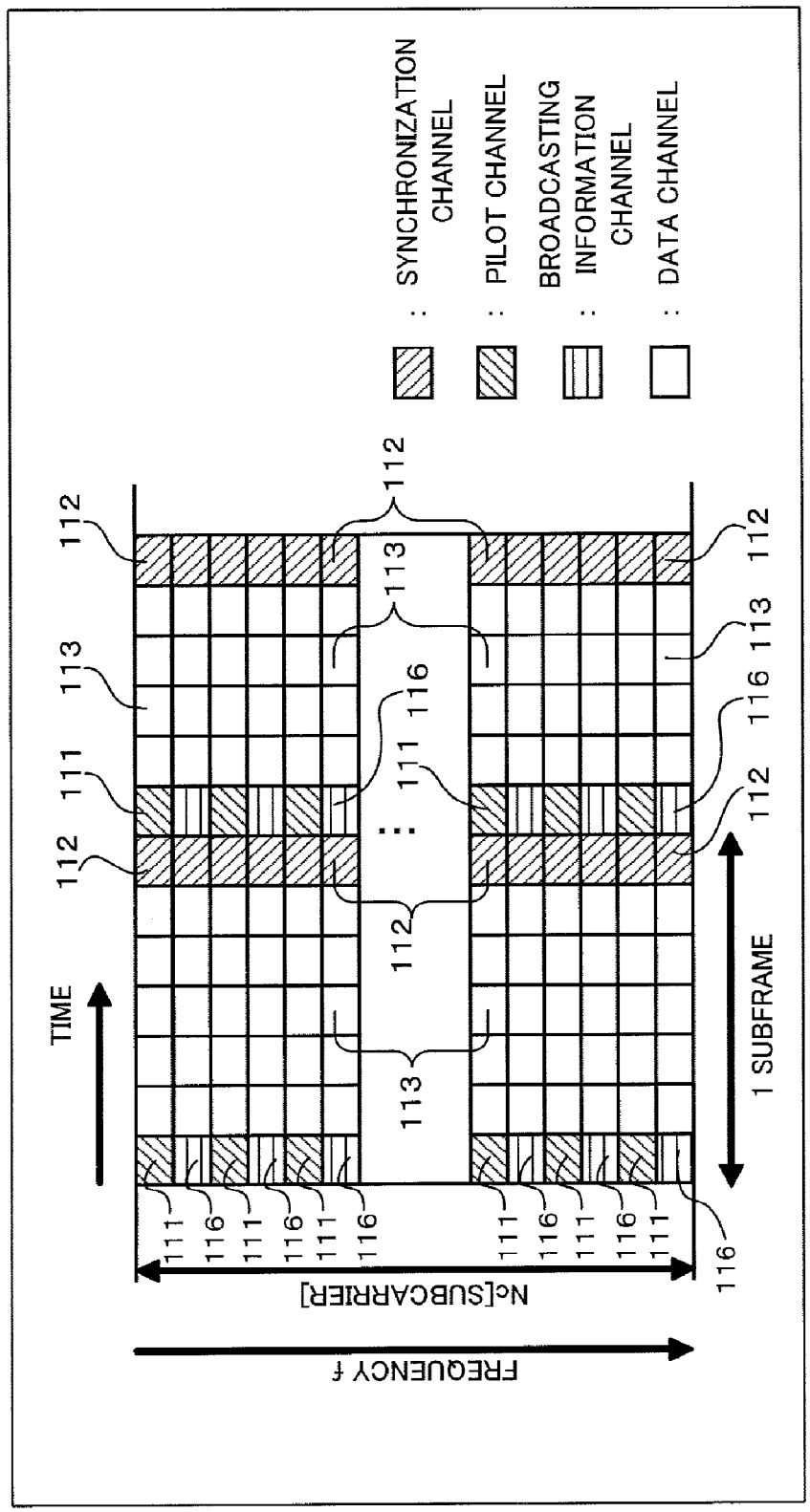
FIG. 10 is a diagram illustrating an example of a subframe format (two-dimensional expression) according to a second embodiment.

Therefore, on the base station 1, as shown in FIG. 10, for example, a broadcasting information channel (BCH), which is indicated by the reference character 116, is allocated (multiplexed) to a subcarrier without a pilot symbol (see the diagonally shaded area 111) of the head of the subframe inserted thereto, not a data channel (see the reference character 113). In this instance, the reference character 112 indicates a synchronization channel (SHC) also in the present example.

Figure 11:
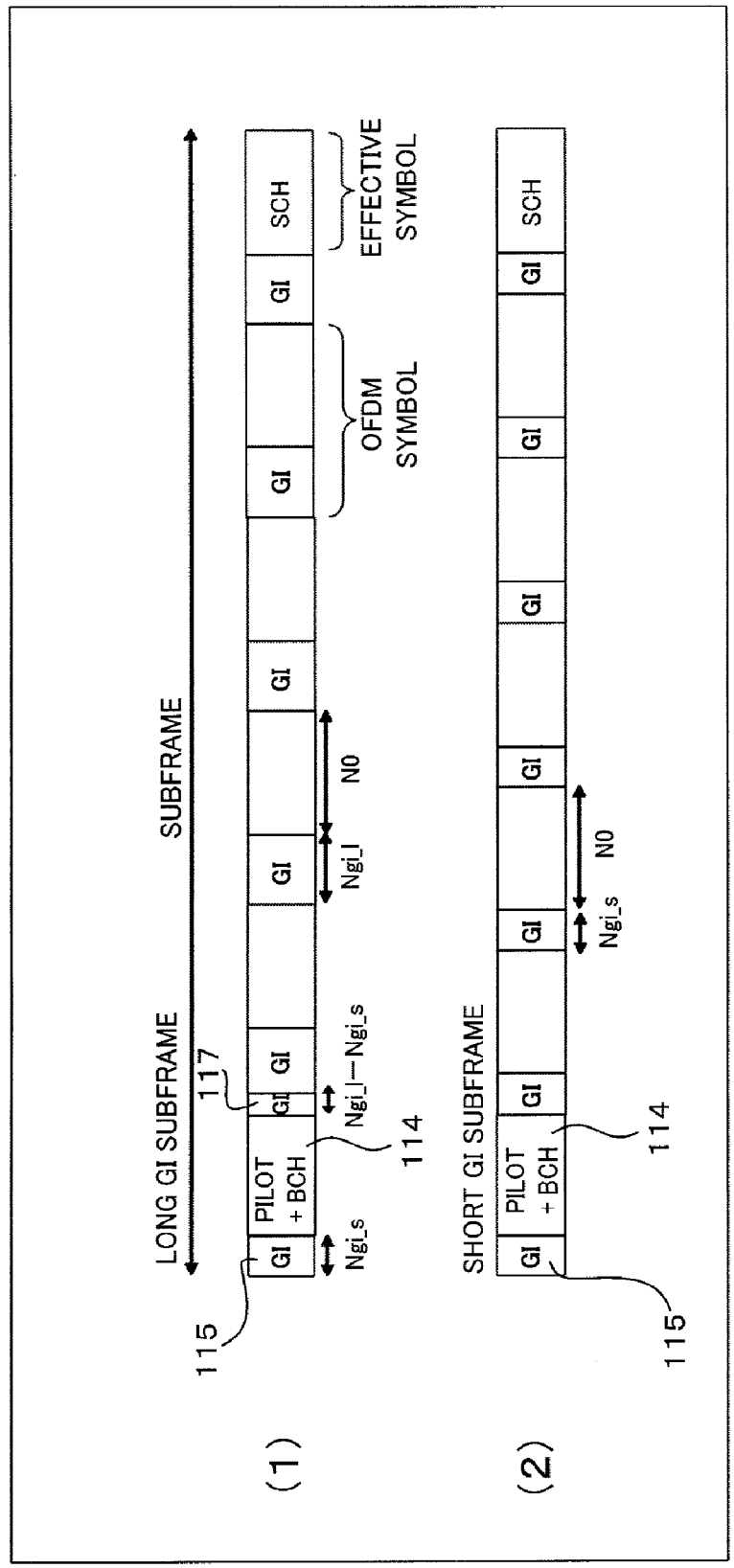
FIG. 11 is a diagram illustrating an example of a subframe format (time domain expression) according to the second embodiment.

Here, FIG. 10 shows subframe formats in a two-dimension allocation with time and subcarrier (frequency). If the subframe formats are shown in the time domain, it becomes what is shown in FIG. 11, like FIG. 5. That is, in FIG. 11, (1) of FIG. 11 shows a long GI subframe format; (2) of FIG. 11 shows a short GI subframe format. In any of the formats, a pilot symbol and a broadcasting information channel (BCH) (hereinafter, will also be simply called "broadcasting information") are multiplexed (frequency-division multiplexed) to the leading portion of the effective symbol (see the reference character 114).

In this instance, the other frame constructions are the same as those of FIG. 5. Like in the first embodiment, in a case of a long GI subframe and also in a case of a short GI subframe, a guard interval of the same GI length Ngi_s is inserted (time-division multiplexed) (see the reference character 115) to before the effective symbol of the head of the subframes, and a guard interval of a GI length (Ngi_l–Ngi_s) remained after subtracting a GI length (Ngi_s) which is added before the effective symbol from the original GI length Ngi_l is inserted into the end of the leading long GI subframe (see the reference character 117).

Accordingly, on the base station 1, information necessary for forming the subframe formats shown in FIG. 10 and FIG. 11 is stored in the subframe format storage 16, which is already described with reference to FIG. 1) beforehand. On the basis of the stored information, the channel multiplexing controller 18 controls time-division multiplexing of various channels including the above mentioned broadcasting channel. As a result, basically, it becomes possible to realize transmission in subframe formats shown in FIG. 10 and FIG. 11 without any changes added to the construction of FIG. 1.

In this case, since the positions of the effective symbols to which broadcasting information is multiplexed are apart from the subframe timing by the same amount in the long GI subframe and the short GI subframe, even if information relating to a GI length is unknown, the mobile station 2 is capable of performing FFT processing to the effective symbol, that is, a pilot symbol and broadcasting information, of the head of the subframe in an appropriate time division with a construction and processing equal to those of the first embodiment, thereby realizing appropriate cell search processing and reception processing of broadcasting information (demodulation processing).

Here, if information (GI length itself or information relating to transmission patterns of subframes of different GI lengths) relating to the GI length of a subframe transmitted by the base station 1 are included as the above mentioned broadcasting information, demodulation processing thereafter performed by the demodulation processor 24 is able to be performed based on GI length information obtained by demodulating the broadcasting information. In this instance, the amount of information transmittable by the broadcasting information is limited. Thus, if the amount of information to be transmitted exceeds the information amount transmittable as one piece of broadcasting information, the base station 1 is capable of making the information divided and contained in multiple subframes.

Other operations of the base station 1 and the mobile station 2 are the same as those of the first embodiment.

In this instance, although the mapping of guard intervals is controlled in such a manner that the effective data beginning positions of the leading symbols of the subframes are apart from frame timing by the same amount in the above description, the mapping of guard intervals can also be controlled in such a manner that the effective data beginning positions are apart from frame timing by the same amount with respect to the second symbol and those of thereafter. For example, the mapping of guard intervals can be controlled in such a manner that the effective data beginning positions of the third symbol of a short GI subframe and of the second symbol of a long GI subframe are apart from frame timing by the same amount. In such a case, a pilot and broadcasting information are multiplexed to the effective data whose effective data beginning positions are apart from frame timing by the same amount.

C Third Embodiment

Figure 12:
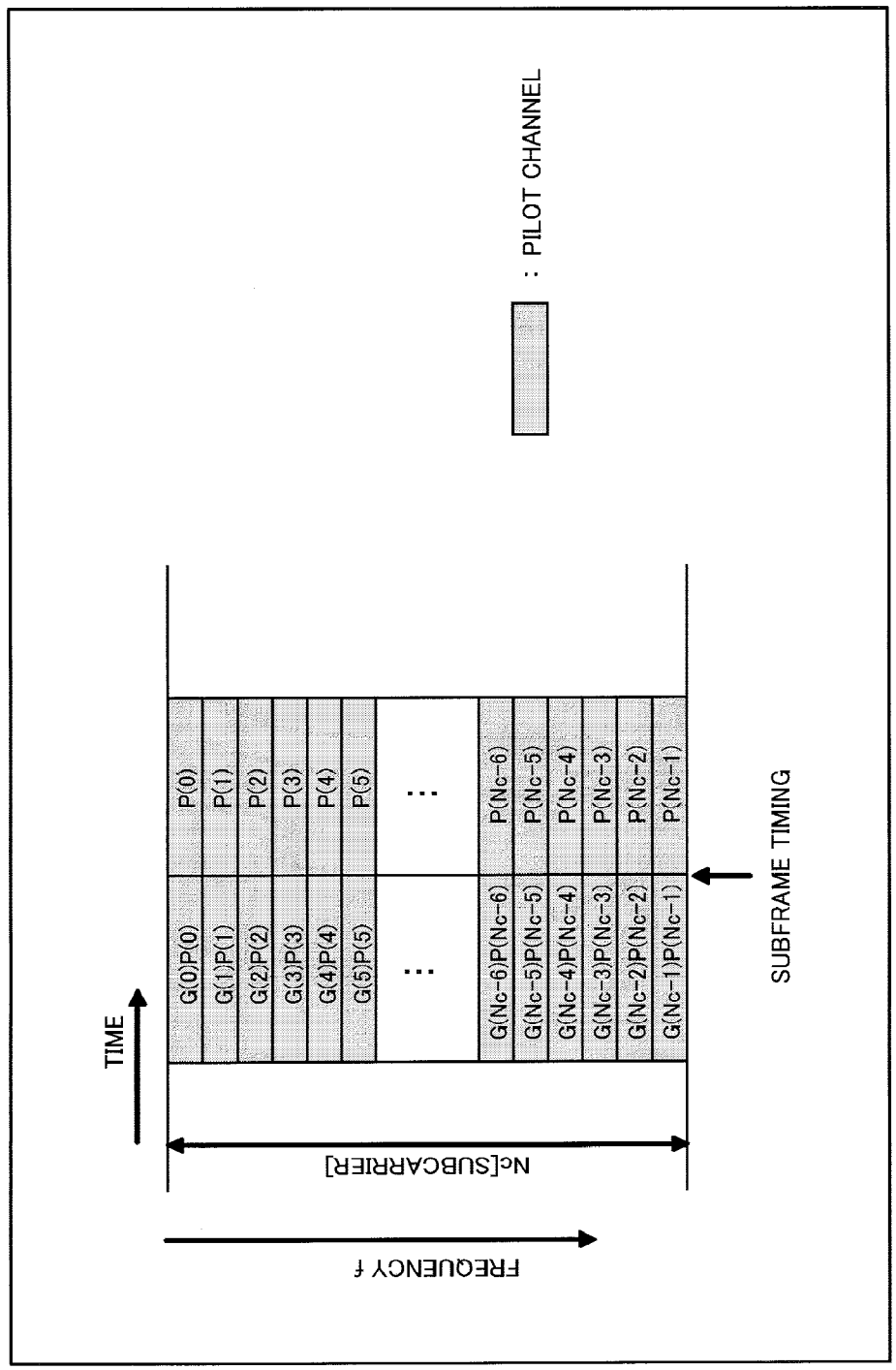
FIG. 12 is a diagram illustrating an example of a subframe format (two-dimensional expression) used in a previous art (non-patent document 3)

According to the already described technology (three-stage high-speed cell search method) proposed in the above non-patent document 3, which is cited as a previous art, as shown in FIG. 12, for example, a pilot symbol is multiplexed to the head and the end of a subframe. As the pilot symbol of the end of a frame, a pattern (scramble code group information) G(i) P(i) obtained by multiplying the leading pilot pattern P(i) (i=0 through Nc-1) by a group code G(i), which is information for specifying (identifying) a scramble code group, is used. In this FIG. 12, a pilot symbol is multiplexed to all the subcarriers, but multiplexing can be performed with thinning down of subframes, such as to every other subcarrier.

The following will be a description of an overview of cell search processing in this technology. On the first stage, symbol timing is detected utilizing a correlation characteristic of a guard interval; on the second stage, subframe timing and a scramble code group are detected utilizing pilot symbols each allocated before and after a subframe, respectively. Then, after FFT processing, in each subcarrier, multiplication is performed by using one of the symbols adjacent to each other in terms of time as a complex conjugate, as shown in the following formula (1). This makes it possible to extract a group code G(i) in a case of subframe timing.

[Formula 1]

$$G(i)P(i) \times P^*(i) = |P(i)|^2 G(i) \quad (1)$$

Accordingly, in all the candidate sub-fame timing, a correlation with a candidate group code is obtained with respect to a series obtained by multiplication of a complex conjugate of symbols adjacent to each other in respect to time, and subframe timing and a group code G(i) which obtains the maximum correlation are determined to be detection values.

Then, on the third stage, by means of obtaining correlation between the candidate scramble codes contained in the group detected on the second stage, a subject scramble code is detected.

However, this technology is on the assumption of using a subframe format having a fixed GI length in the system. Thus, in a case where the technology is applied to the system in which subframe formats of multiple GI lengths are mixed, the following issues are caused as described above.

That is, a group code is demodulated by a pilot of the head of a neighbor subframe in time domain. When multiple subframes of different GI lengths are mixed, it is necessary to perform demodulation processing to all the candidate guard interval lengths by using a pilot symbol which has been subjected to FFT processing. In addition, in this case, increase in the amount of processing and increase of the number of candidates at the time of detection thereof lead to deterioration of characteristics.

In contrast, in the above described embodiment, since at least the position of an effective symbol to which a pilot symbol is multiplexed does not depend on the GI lengths of different formats (whether the format is a long GI subframe format or a short GI subframe format), it is always possible to execute uniform processing. Thus, the issues of the above previous art are resolved by utilizing such a characteristic of the above described embodiment.

Figure 13:
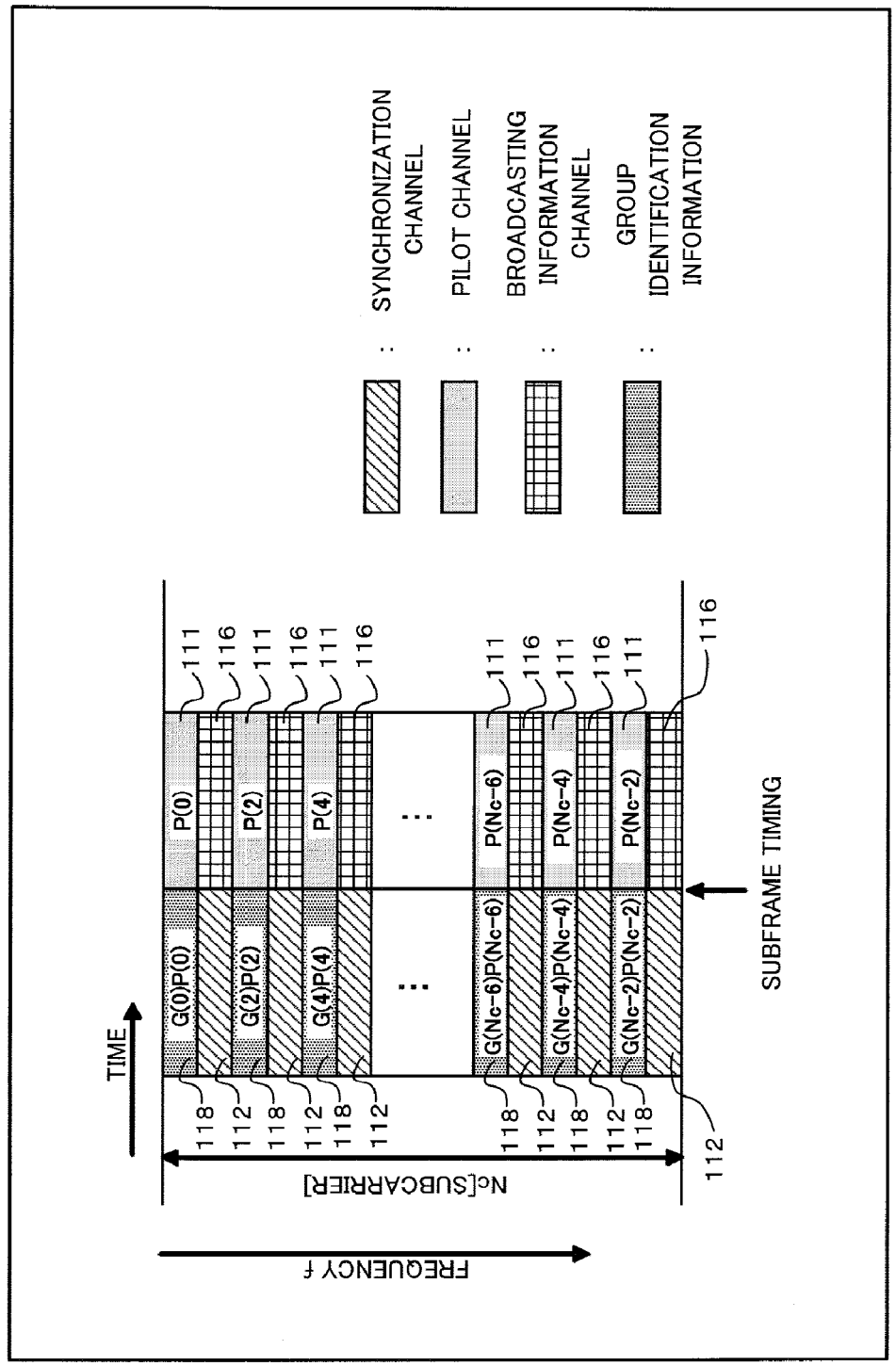
FIG. 13 is a diagram illustrating an example of a subframe format (two-dimensional expression) according to a third embodiment.
Figure 14:
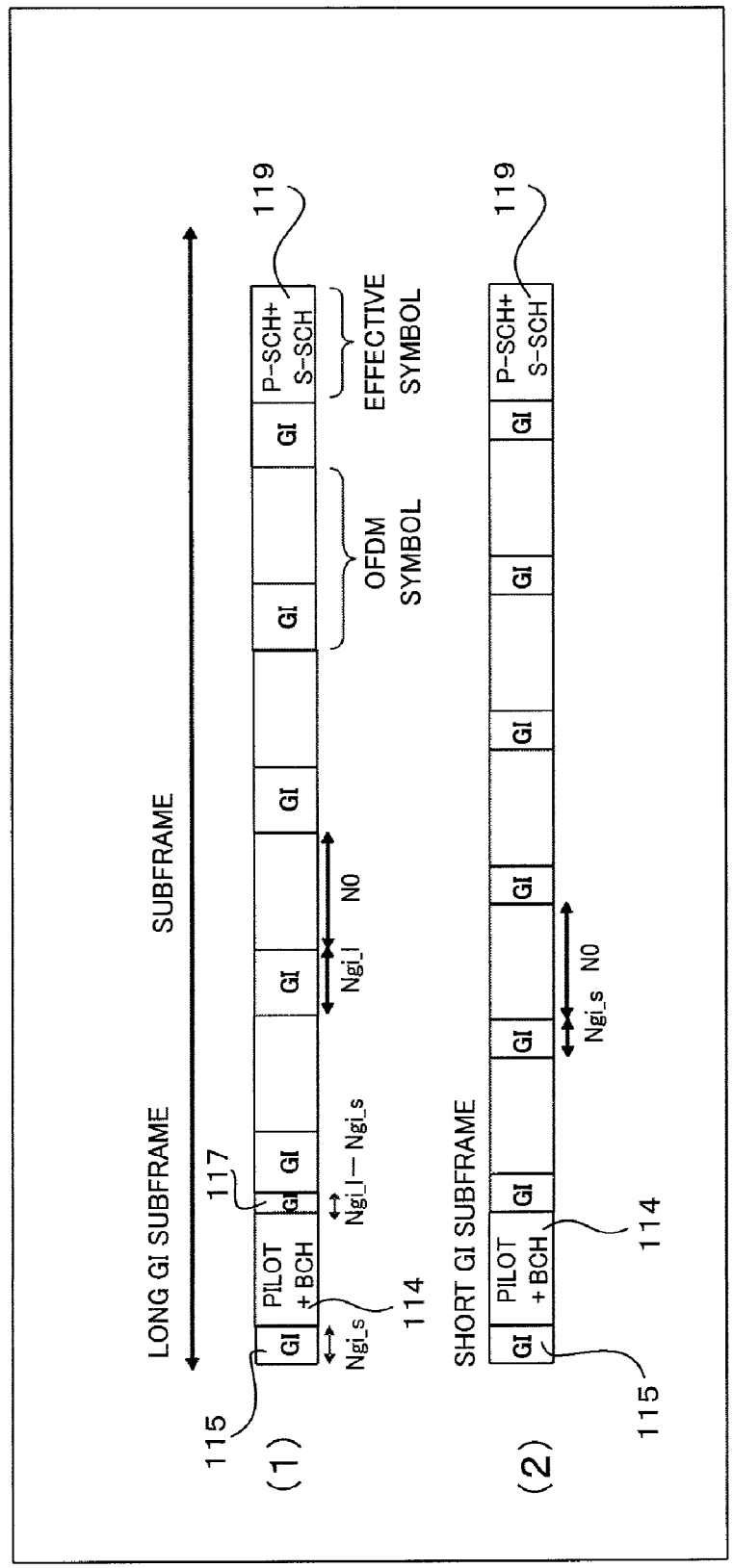
FIG. 14 is a diagram illustrating an example of a subframe format (time domain expression) according to the third embodiment.

That is, in the present example, the format shown in FIG. 13 and FIG. 14 is applied as a subframe format. Here, FIG. 13 shows a subframe format in the two-dimensional manner with frequency f and time t, with an attention paid to an effective symbol at the end of the subframe which is antecedent to the other subframe, out of the two subframes adjacent to each other in time domain, and to the leading effective symbol of the subframe which is subsequent one in time domain. FIG. 14 expresses the subframe formats in the time domain.

Then, as shown in FIG. 13, in the present example, a pilot channel 111 is inserted into the effective symbol of the head of a subframe at every other subcarrier intervals, and a broadcasting information channel (BCH) 116 is inserted into the remaining subcarriers. Group identifying information (S-SCH) 118 is inserted into the effective symbol of the end of the subframe, and also, a synchronization channel (P-SCH) 112 is inserted into the remaining subcarriers.

That is, in the time domain expression of FIG. 14, a pilot channel and a broadcasting information channel (BCH) are frequency-division multiplexed to the effective symbol indicated by the reference character 114 with respect to both of the long GI subframe shown in (1) of FIG. 14 and the short GI subframe show in (2) of FIG. 14. In addition, a synchronization channel (P-SCH) and a group identifying information (S-SCH) are frequency-division multiplexed to the effective symbol indicated by the reference character 119 of the end of the subframe.

In this instance, in the present example, also, a pattern G (i) P (i) obtained by multiplying a code G (i) unique to a group by a pilot pattern P(i) of the pilot channel 111 adjacent to the code G(i) in time domain is used as group identifying information (S-SCH) 118. Further, as a code G(i) unique to a group, an orthogonal code, for example, a Walsh code is used.

Even if such a subframe having the above described construction (format) is employed, it is basically possible to realize transmission in the subframe format shown in FIG. 13 and FIG. 14 with a construction similar to that of FIG. 1, with the subframe format storage 16 which stores information used for forming the subframe format shown in FIG. 13 and FIG. 14 beforehand, and with the channel multiplexing controller 18 which controls time-division multiplexing processing of each channel containing information used in forming the subframe format shown in FIG. 13 and FIG. 14.

On the other hand, on the mobile station 2, similar to the first embodiment, subframe timing is detected utilizing the synchronization channel (SCH) as the first stage processing. That is, it is possible to detect subframe timing with a construction equal to the construction of the first stage processor 22 shown in FIG. 1.

As the second stage processing, a reception signal is subjected to FFT processing using the thus detected subframe timing and is converted into a frequency domain signal. After that, group identifying information and a pilot channel is extracted. Then, as shown in the above formula (1), correlation is taken between (i) a series obtained by multiplying the group identifying information by a complex conjugate of the pilot channel adjacent in terms of time and (ii) a candidate group code. For example, a group obtaining the maximum correlation value may be identified as a detected group.

At that time, according to the present invention, as shown in FIG. 14, since the position of the effective symbol to which a pilot channel P(i) is multiplexed does not depend on the GI length of subframes (whether the subframe is a long GI subframe or a short GI subframe), the above mentioned FFT processing is able to be performed to an effective symbol division to which a pilot channel is multiplexed always in an appropriate FFT window. Accordingly, even in a case where subframes of different GI lengths are present in a mixed manner thereof, it is possible to avoid deterioration of characteristics due to increase of the amount of processing and increase of the number of candidates at the time of candidate detection.

In this instance, in the third stage processing, correlation between a pilot channel and candidate scramble codes contained in the group which is detected (identified) in the second stage is obtained, a scramble code thereby being detected.

That is, in the construction of the mobile station 2 shown in FIG. 6, for example, the processing in the second stage and the third stage is able to be realized by a construction including: a pilot/group identifying information extractor 23-7, which extracts a pilot channel and information for identifying a group, in place of the pilot extractor 23-3; a candidate group code storage 23-9 provided for the previous stage of the pilot correlation processor 23-5; and a group identifying processor 23-8, which performs an arithmetic operation of the above formula (1) using candidate group codes stored in the candidate group code storage 23-9 for identifying a subject group.

Figure 15:
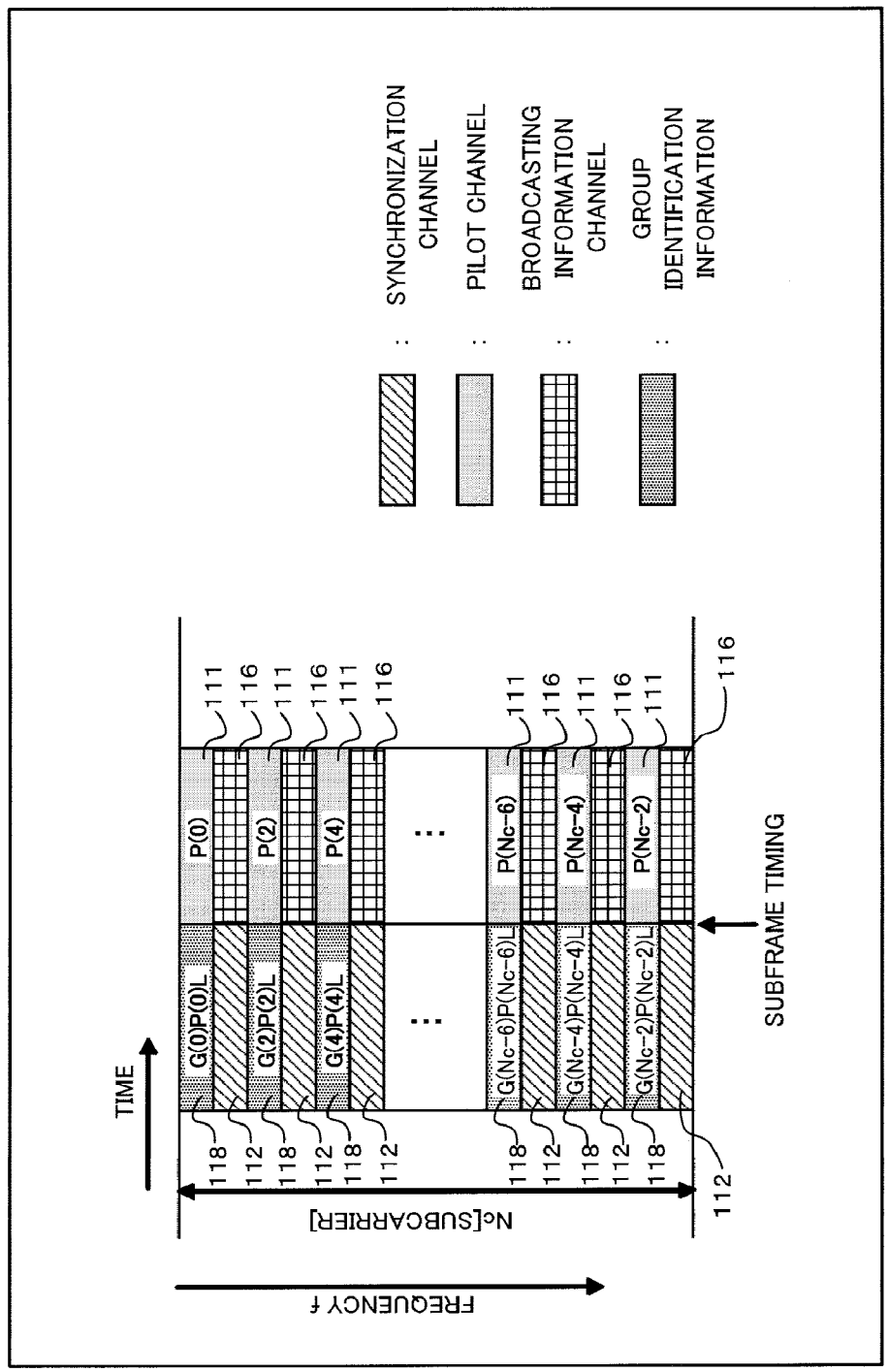
FIG. 15 is a diagram illustrating an example of another subframe format (two-dimensional expression) according to the third embodiment.

In this instance, as shown in FIG. 15, the group identifying information 118 contains information relating to GI lengths by multiplication of information L for identifying (distinguishing) a subframe format (hereinafter will be called subframe format information) (for example, L=1, in a case of a short GI subframe; L=−1, in a case of a long GI subframe), thereby making it possible to identify a group and to detect subframe format information, that is, the GI length (whether the subframe is a short GI subframe or a long GI subframe) which is being received.

That is, subframe format information is able to be detected by means of deciding, for example, the polarity of the maximum correlation value out of values of correlation with a code unique to a candidate group. In this case, since a subframe format is already detected at the time of scramble code processing, merits of a long guard interval are capitalized on in a case of a long GI subframe at the time of scramble code processing in the next stage, and thus, the characteristics of processing in the third stage are improved. Here, increase of the number of candidates in processing in the second stage (the number of groups×the number of subframe formats) makes it difficult to improve characteristics of processing in the second stage.

In this instance, although information to be transmitted as a broadcasting information channel is not specified in the present example, if the broadcasting channel contains information relating to transmission patterns or the like of the subframes of different GI lengths in addition to the above subframe format information L which is being transmitted by the base station 1, it becomes possible to perform demodulation processing after cell search in accordance with different GI lengths based on the transmission patterns, so that an advantage of improvement of characteristics is brought about.

D Fourth Embodiment

Figure 16:
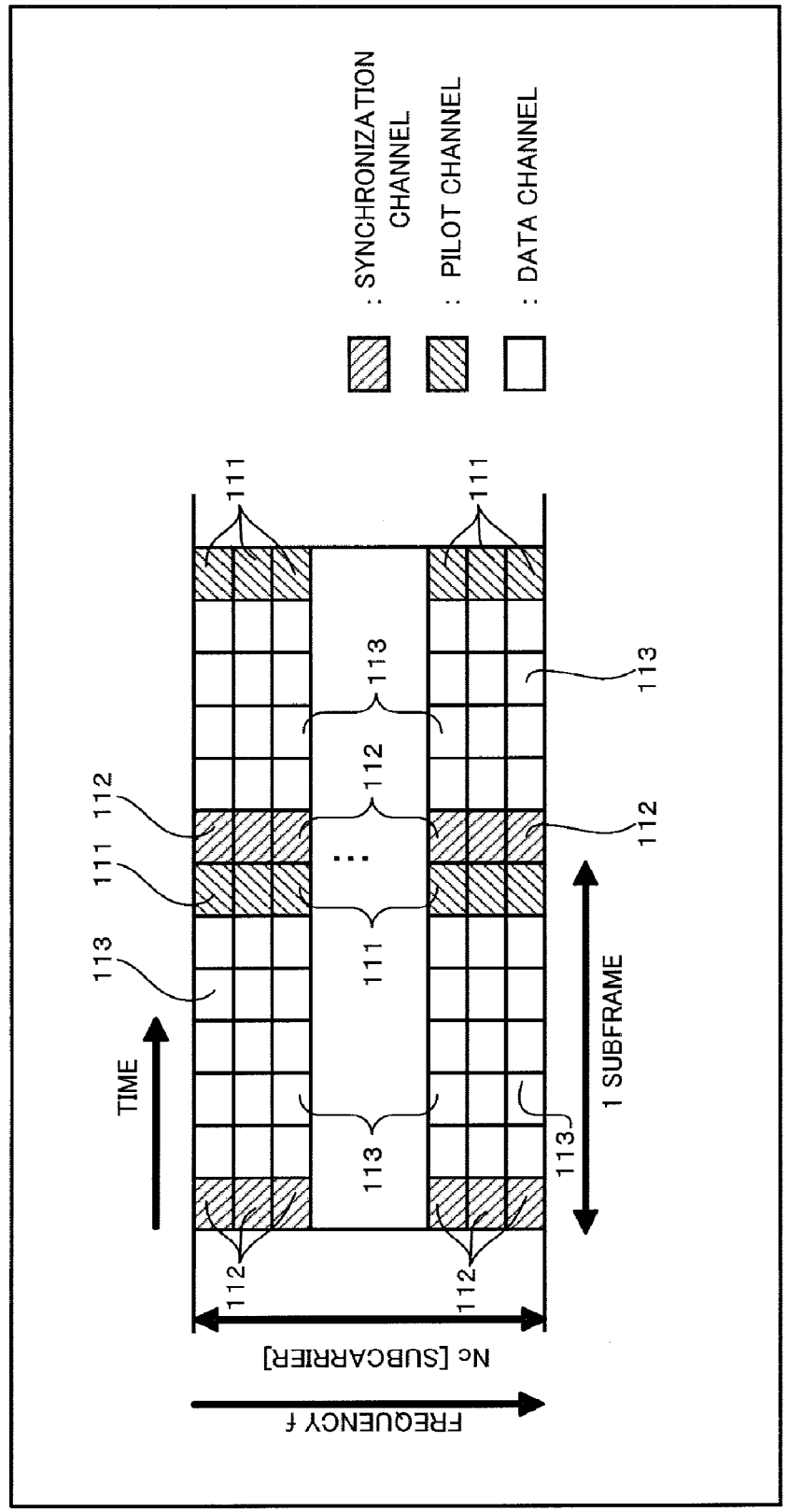
FIG. 16 is a diagram illustrating an example of a subframe format (two-dimensional expression) according to a fourth embodiment.
Figure 17:
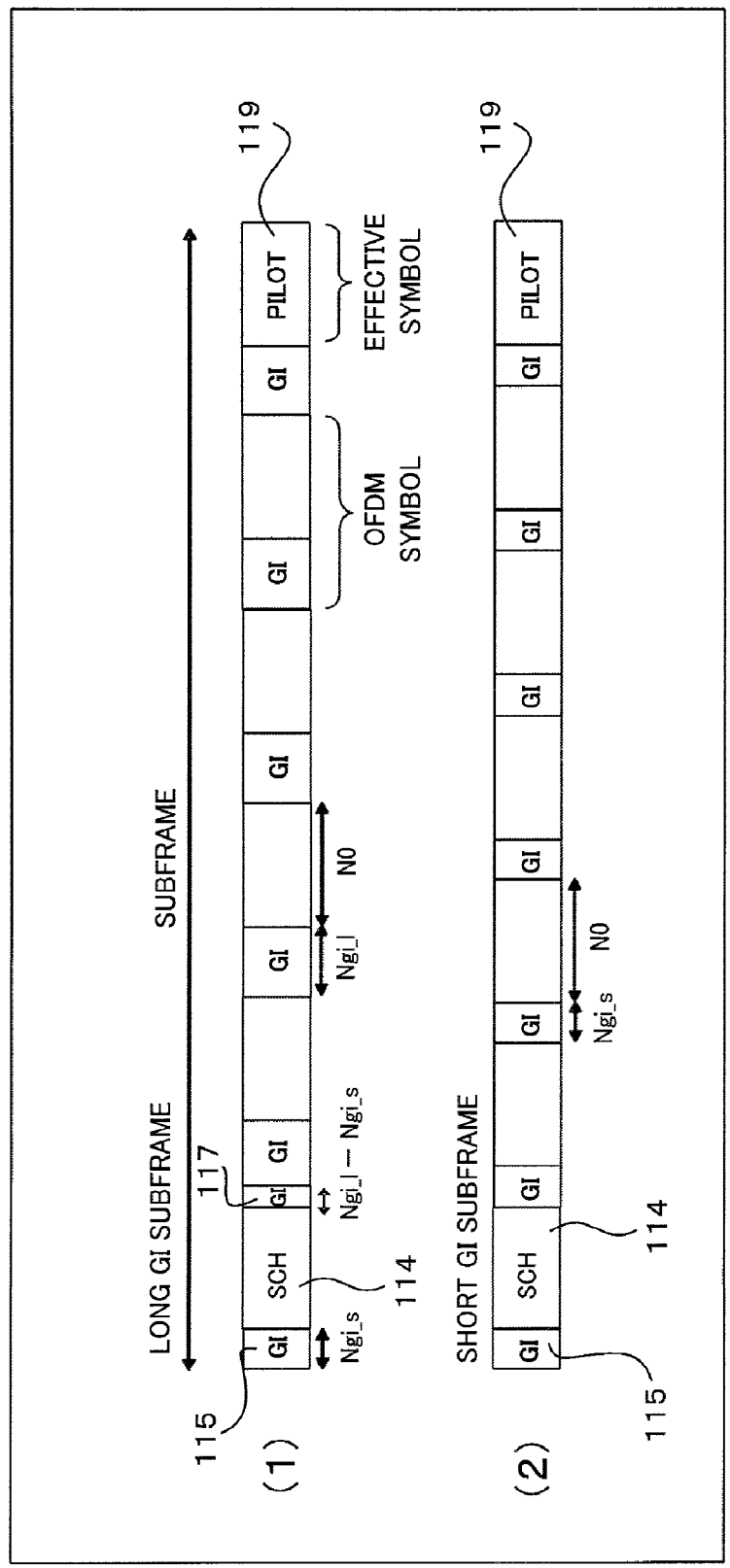
FIG. 17 is a diagram illustrating an example of a subframe format (time domain expression) according to the fourth embodiment.

In the above described embodiments, a pilot channel is mapped (multiplexed) to the effective symbol of the head of a subframe, and a synchronization channel (SCH) is multiplexed to the effective symbol at the end of the subframe. However, such relationships can be exchanged. For example, as shown in FIG. 16 and FIG. 17, a synchronization channel (SCH) can be multiplexed to the effective symbol of the head of a subframe (see the diagonally shaded area 112 of FIG. 16 and the reference character 114 of FIG. 17), and a pilot channel can be multiplexed to the effective symbol at the end of the subframe (see the diagonally shaded area 111 of FIG. 16 and the reference character 119 of FIG. 17). In this instance, the reference character 113 indicates a data channel also in the present example.

Here, FIG. 16 expresses a subframe format in the two-dimensional allocation with time and a subcarrier (frequency). (1) of FIG. 17 shows a long GI subframe format; (2) of FIG. 17 shows a short GI subframe format. Further, in the present example, also, as shown in (1) of FIG. 17, a guard interval of a GI length equal to a GI length Ngi_s of a short GI subframe is multiplexed to before the leading effective symbol at the head of a long GI subframe (see the reference character 115), and a guard interval of a GI length of (Ngi_l−Ngi_s), which is a remained portion obtained by subtracting a GI length Ngi_s that is multiplexed to the end of the effective symbol from the original GI length Ngi_l, is multiplexed to before the effective symbol of the head of the long GI subframe (see the reference character 117).

As to a subframe having the above described construction (format), also, it is basically possible to realize transmission in the subframe format shown in FIG. 16 and FIG. 17 with a construction similar to that of FIG. 1, in which the subframe format storage 16 stores information for forming the subframe format shown in FIG. 16 and FIG. 17 beforehand, and the channel multiplexing controller 18 controls time-division multiplexing processing of each of the above mentioned various channels.

Figure 18:
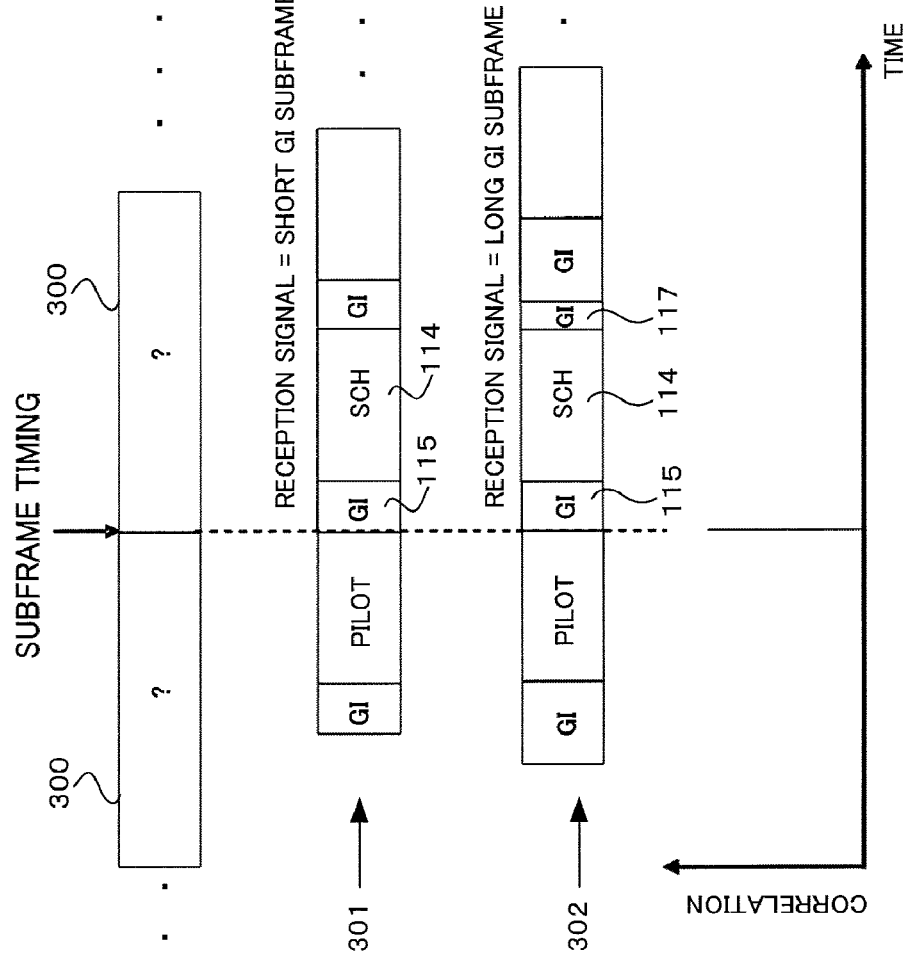
FIG. 18 is a schematic diagram for describing reception processing (FFT processing) on the mobile station in a case where the subframe format shown in FIG. 17 is used.

By using such a subframe format, on the reception end (mobile station 2), the position of multiplexing of the synchronization channel (SCH) is fixed, independent of whether a reception signal from the base station 1 is a long GI subframe or a short GI subframe, as schematically shown in FIG. 18, for example, so that subframe timing is able to be detected with ease and reliability.

That is, as schematically shown in FIG. 18, even in a case where it is unknown whether the subframe format of a reception signal (see the reference character 300) is a short GI subframe format (see the reference character 301) or a long GI subframe format (see the reference character 302), it is possible to detect timing showing the maximum correlation value in the correlation processor 22-2 (see FIG. 6) with ease and reliability, since a guard interval (see the reference character 115) of the same GI length Ngi_s is inserted to before the leading effective symbol of any of the subframes (see the reference character 114).

Further, in this case, since a pilot channel is multiplexed to the effective symbol of the end of the subframe, it is sufficient that the FFT 23-2 (see FIG. 6) performs FFT processing in an invariant FFT window regardless of the type of the subframe format of a reception signal, so that it is unnecessary to perform FFT processing in multiple FFT window candidates.

In this manner, according to the present example, multiplexing of a pilot channel to the effective symbol of the end of a subframe makes it possible to capitalize on merits of a long guard interval added, in comparison with the first embodiment, at the time of detection processing of a scramble code performed by the scramble code detector 23-6 (see FIG. 6), and characteristics improvement can be expected.

In this instance, according to the above embodiment, the GI length to be multiplexed to before the effective symbol of the head of a long GI subframe is adjusted to the GI length (the minimum GI length) Ngi_s used in a short GI subframe, for the purpose of making the multiplexing position of the effective symbol (pilot channel or synchronization channel) fixed. However, contrary adjustment is also available such that the GI length to be multiplexed to before the effective symbol of the head of a short GI subframe is adjusted to the GI length Ngi_l used in a long GI subframe.

Further, in a case where three or more subframes of different GI lengths are present in a mixed condition thereof, it is sufficient that at least the GI length is adjusted in such a manner that a guard interval of the same GI length is multiplexed to before the leading symbol of each subframe (the GI length can be adjusted to that which is used in any of the subframes, and also, a fixed GI length can be determined for each subframe).

Furthermore, in the above described embodiments, although adjustment of the GI length is performed to the effective symbol of the head of a subframe, the similar GI length adjustment can be performed to the effect symbol other than the leading effective symbol of the subframe.

In addition, in the above description, although a guard interval mapping is controlled in such a manner that the effective data beginning positions of the leading symbols of the subframes are apart from frame timing by the same amount, guard interval allocation can also be controlled in such a manner that the effective data beginning positions are apart from subframe timing by the same amount with respect to the second symbol or those thereafter. For example, guard interval mapping can be controlled in such a manner that the effective data beginning positions of the third symbol of a short GI subframe and the second symbol of the long GI subframe is apart from subframe timing by the same amount as that by which the effective data beginning position of the second symbol of a long GI subframe is apart from subframe timing. In such a case, synchronization channels are multiplexed to effective data whose positions are apart from the subframe timing by the same amount.

E Fifth Embodiment

The following formula (2) expresses discrete Fourier transform (DFT) of a signal in which $g_k$ (Here, k expresses time [sample] and is $0 \leq k \leq N-1$, and N expresses DFT size) is cyclically shifted by $\Delta k$ [sample].

[Formula 2]

$$\sum_{k=0}^{N-1} g_{k-\Delta k} \left(e^{-j\frac{2\pi}{N}}\right)^{nk} = \sum_{k=0}^{N-1} g_{k-\Delta k} \left(e^{-j\frac{2\pi}{N}}\right)^{n(k-\Delta k)} \left(e^{-j\frac{2\pi}{N}}\right)^{n\Delta k} = G_n \left(e^{-j\frac{2\pi}{N}}\right)^{n\Delta k} \quad (2)$$

Here, in the above formula (2), $G_n$ is expressed by following formula (3), and is a series of a frequency domain with an effective symbol subjected to DFT. In this instance, n is the number of the subcarriers, and $0 \leq n \leq N-1$.

[Formula 3]

$$G_n = \sum_{k=0}^{N-1} g_k \left(e^{-j\frac{2\pi}{N}}\right)^{nk} \quad (3)$$

That is, a series in the frequency domain of a signal in which an effective symbol is cyclically shifted by $\Delta k$ [sample] is equal to a serial obtained by giving phase rotation to a series in the frequency domain of an effective symbol by $2\pi\Delta k/N$ per subcarrier in the frequency direction.

Accordingly, in the above described first embodiment, it can be considered that the leading OFDM symbol of a long GI subframe, a guard interval is added before and after thereof, is an OFDM symbol in which a guard interval Ngi_l [sample] added to before the effective symbol [a symbol cyclically shifted by (Ngi_l−Ng_s)] obtained by performing IFFT processing to a series which has been phase-rotated in the frequency direction by (Ngi_l−Ngi_s).

Figure 19:
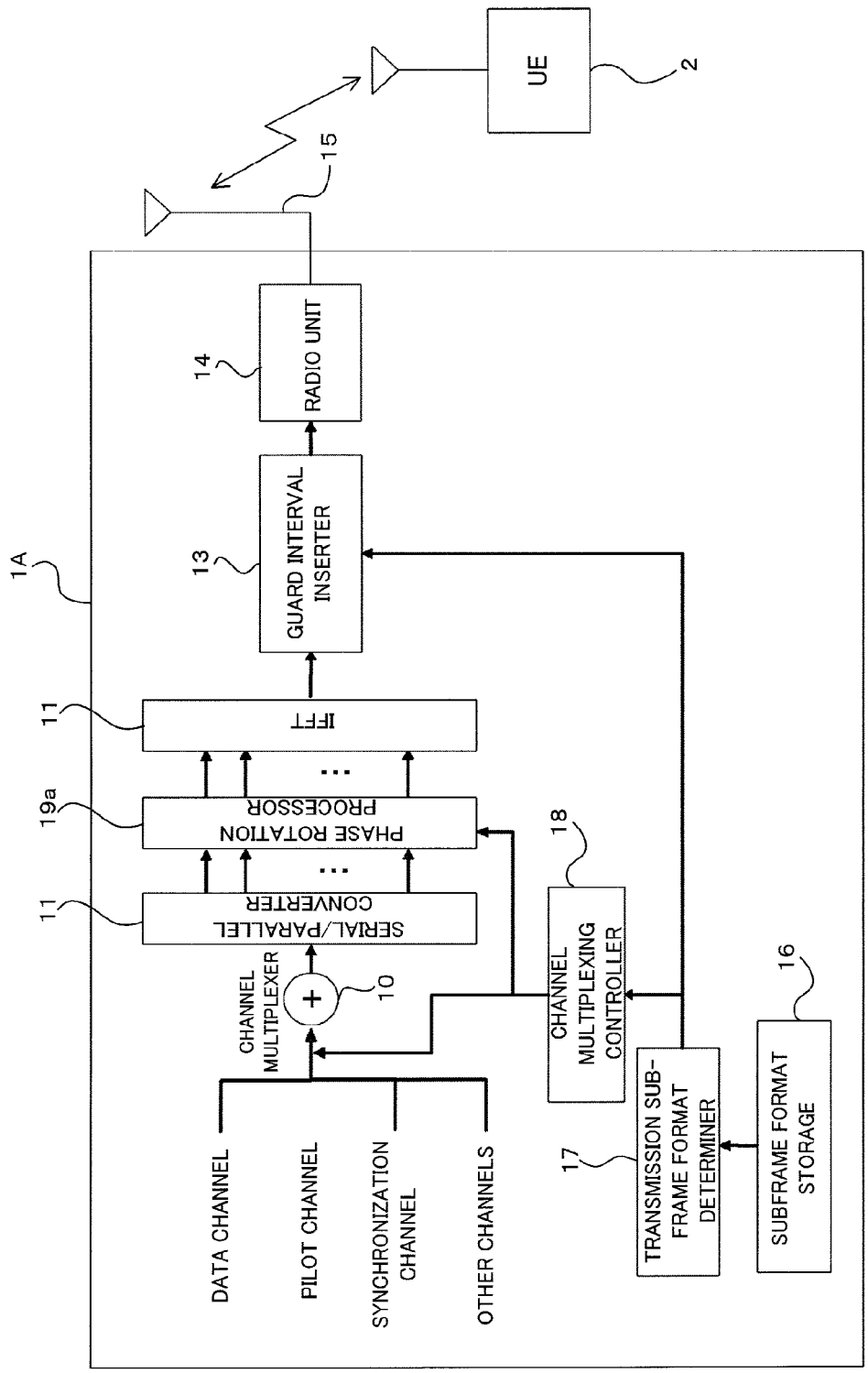
FIG. 19 is a block diagram illustrating a construction of a base station transmitter apparatus according to a fifth embodiment.

Hence, the base station 1 already described with reference to FIG. 1 in the first embodiment can be constructed as a base station transmitter (transmitter) 1A shown in FIG. 19, for example. That is, a phase rotation processor 19a is interposed between the serial/parallel converter 11 and the IFFT 12, which phase rotation processor 19a realizes a construction in which a series to which phase rotation is given beforehand by (Ngi_l−Ngi_s) in the frequency direction, that is, a series in which the phase of the Nth subcarrier component is rotated by $$\left(e^{-j\frac{2\pi}{N}}\right)^{n(N_{gi\_l}-N_{gi\_s})}$$

is input to the IFFT 12 in a case of the leading symbol to which a pilot channel of a long GI subframe is multiplexed, in place of adding a guard interval (the necessity of the guard interval length controller 19 already described is eliminated) before and after the effective symbol of the head of the subframe like in the first embodiment.

In this manner, in place of adding a guard interval before and after the effective symbol of the head of the subframe, a series of the frequency domain input to the IFFT 12 can be phase-rotated in the frequency direction, thereby realizing an operation arithmetically equal to the first embodiment.

Here, the phase rotation processor 19a is controlled by the channel multiplexing controller 18. That is, the channel multiplexing controller 18 has a function of giving an instruction of the above phase rotation given to the effective symbol of the head of a subframe to be performed to the phase rotation processor 19a at the time the transmission subframe format determiner 17 determines that the subframe format is a long GI subframe format. Upon receiving such an instruction, the phase rotation processor 19a executes the above mentioned phase rotation processing. In this instance, in FIG. 19, construction elements indicated by the same reference characters are the same as or similar to those already described unless otherwise described.

Hereinafter, a detailed description will be made of an operation (transmission processing) of the base station transmitter 1A (hereinafter will also be simply called "the base station 1A") performed according to the present embodiment with the above described construction.

Figure 20:
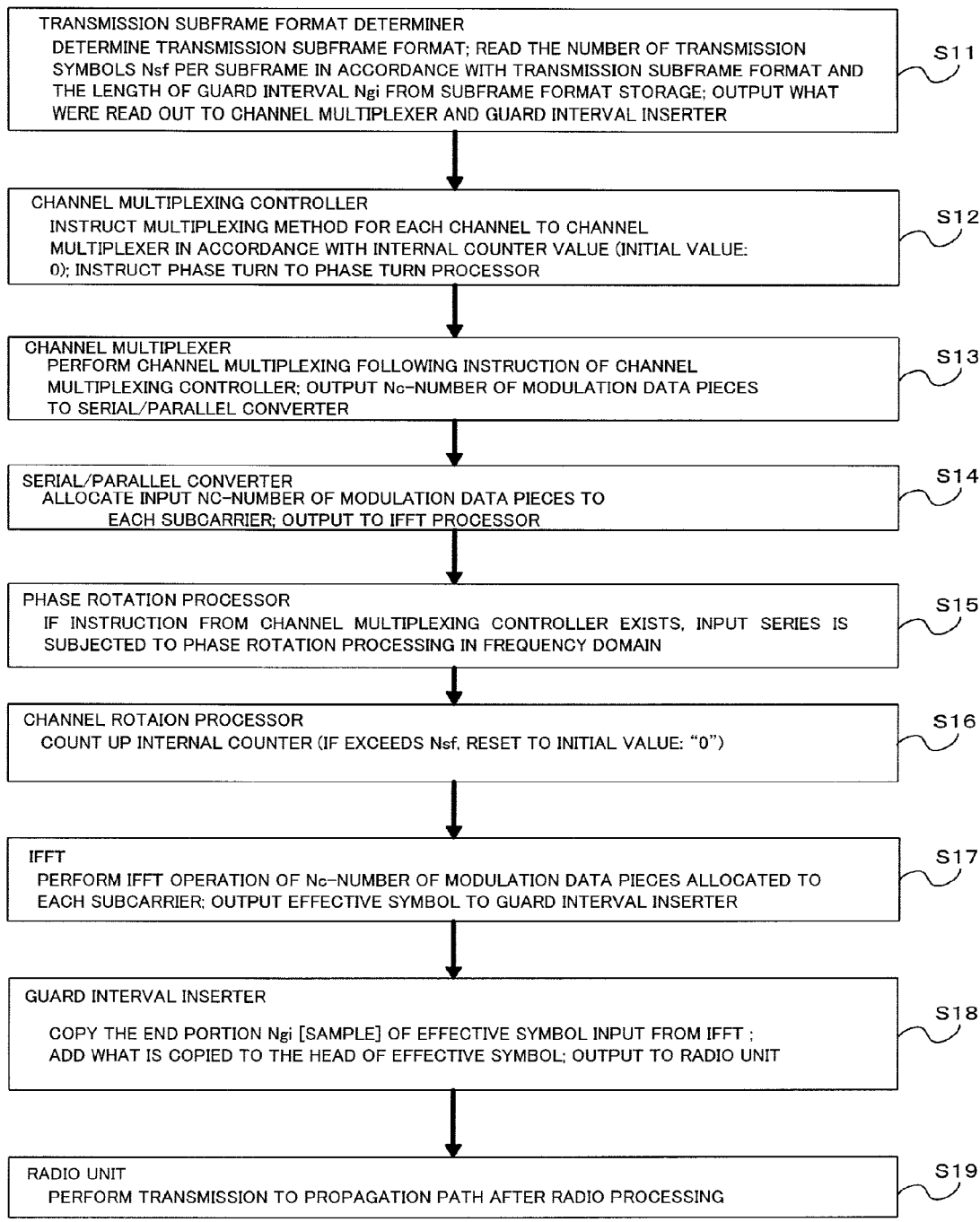
FIG. 20 is a flowchart for describing an operation (transmission processing) of the base station transmitter apparatus shown in FIG. 19.
Figure 21:
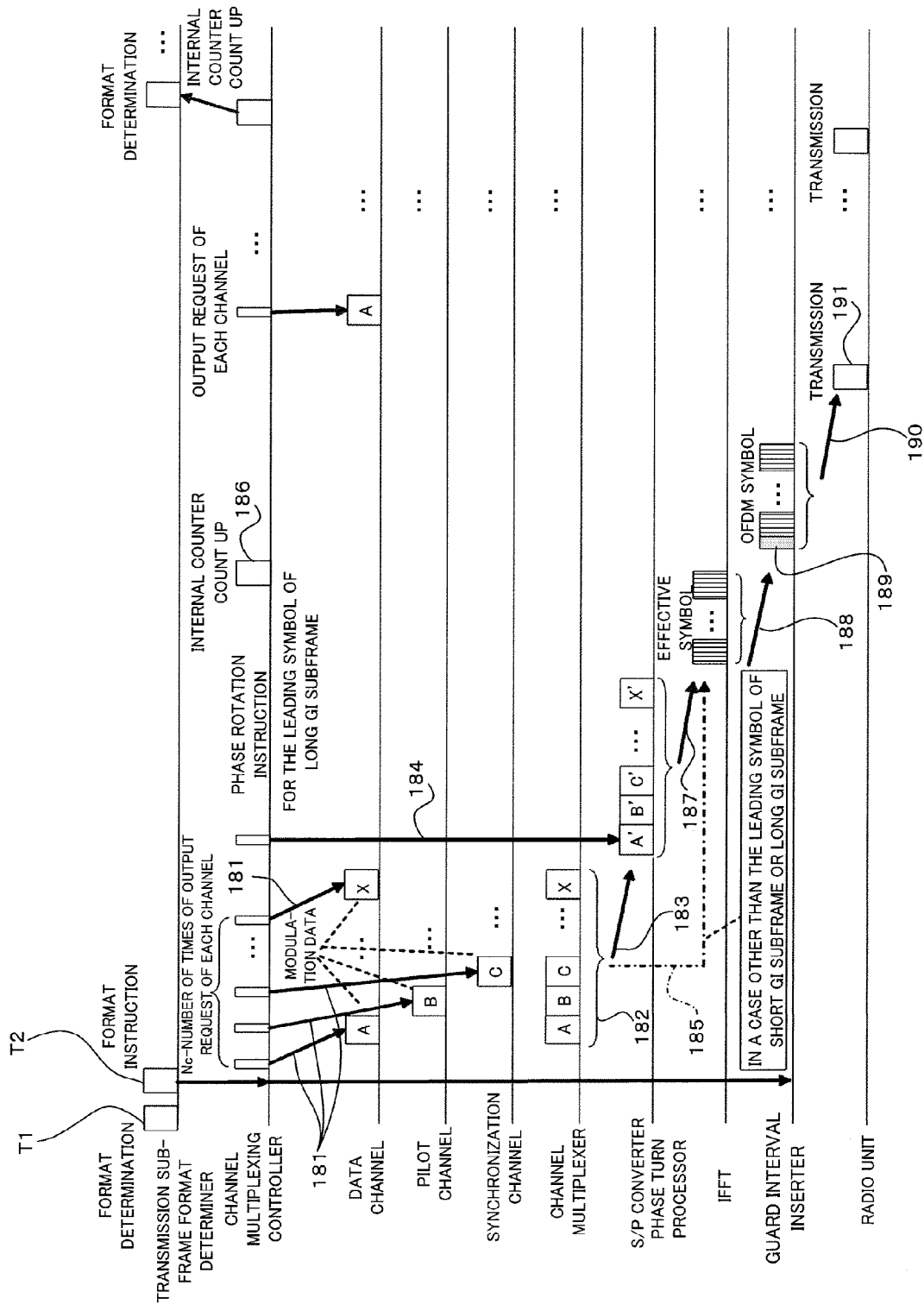
FIG. 21 is a timing chart for describing an operation (transmission processing) of the base station transmitter apparatus shown in FIG. 19.

On the base station 1A, the transmission subframe format determiner 17 determines a transmission subframe format (see timing T1 of FIG. 21), and reads the number Nsf of transmission symbols per subframe and also the guard interval length (Ngi) from the subframe storage 16 corresponding to the transmission subframe format, and then outputs what are read out to the channel multiplexing controller 18 and the guard interval inserter 13 (see step S11 of FIG. 20 and timing T2 of FIG. 21).

Hereby, the channel multiplexing controller 18 instructs the channel multiplexer 10 of the multiplexing method for each channel in accordance with the value of the internal counter (initial value: "0"). If the thus determined transmission subframe format is a long GI subframe format, the channel multiplexing controller 18 gives a phase rotation instruction of the leading symbol thereof to the phase rotation processor 19a (step S12 of FIG. 20). At that time, the channel multiplexing controller 19, as shown in FIG. 21, outputs a request of outputting each channel signal the number of times of the number of subcarriers Nc, thereby making modulation data (A, B, C, . . . ) of Nc-number of channels input to the channel multiplexer 10 in a predetermined sequence, following the above instruction (see the arrow 181).

The channel multiplexer 10 follows the instruction of the channel multiplexing controller 18 to perform time-division multiplexing of modulation data (Nc-number) of each channel (see the reference character 182 of FIG. 21), and outputs Nc-number of modulation data to the serial/parallel converter 11 (see step S13 of FIG. 20 and the arrow 183 of FIG. 21).

On the other hand, the serial/parallel converter 11 performs serial/parallel conversion of the time-division multiplexed signal (Nc-number of modulation data) input from the channel multiplexer 10, and maps the converted data to each subcarrier, and then outputs it to the phase rotation processor 19a (step S14 of FIG. 20). Upon reception of the phase rotation instruction from the channel multiplexing controller 18 (in a case of an effective symbol of the head of the subframe), the phase rotation processor 19a gives phase rotation processing to the input series in the frequency direction as described above, and outputs the result to the IFFT 12 (see step S15 of FIG. 20 and the arrow 187 of FIG. 21). In this instance, in cases other than the effective symbol of the head of the subframe, the above described phase rotation processing is not performed to those input series, and the input series is output to the IFFT 12 (see the dotted arrow 185 of FIG. 21).

Then, the channel multiplexing controller 18 counts up the value of the internal counter. Here, if the value exceeds Nsf as a result of such counting up, the value is reset to "0" (see step S16 of FIG. 20 and the reference character 186 of FIG. 21). In this instance, Nsf means the upper limit value of the number of OFDM symbols, and as in the case of the first embodiment, for example, the number of symbols is seven in a case of a short GI subframe, and the number of symbols is six in a case of a long GI subframe.

The IFFT 12 performs IFFT processing of Nc-number of pieces of modulation data mapped to each subcarrier, and outputs an effective symbol to the guard interval inserter 13 (see step S17 of FIG. 20 and the arrow 188 of FIG. 21).

The guard interval inserter 13 copies the end Ngi [sample] of the effective symbol input from the IFFT 12, and adds what is copied to before the effective symbol (see the reference character 189 of FIG. 21), and outputs the Ngi [sample]-added effective symbol to the radio unit 14 (see step S18 of FIG. 20 and the arrow 190 of FIG. 21).

Then, the radio unit 14 performs radio processing such as up conversion to the OFDM symbol from the guard interval inserter 13, and transmits the transmission radio signal from the transmitter antenna 15 to a propagation path (see step S19 of FIG. 20 and the reference character 191 of FIG. 21).

Figure 22:
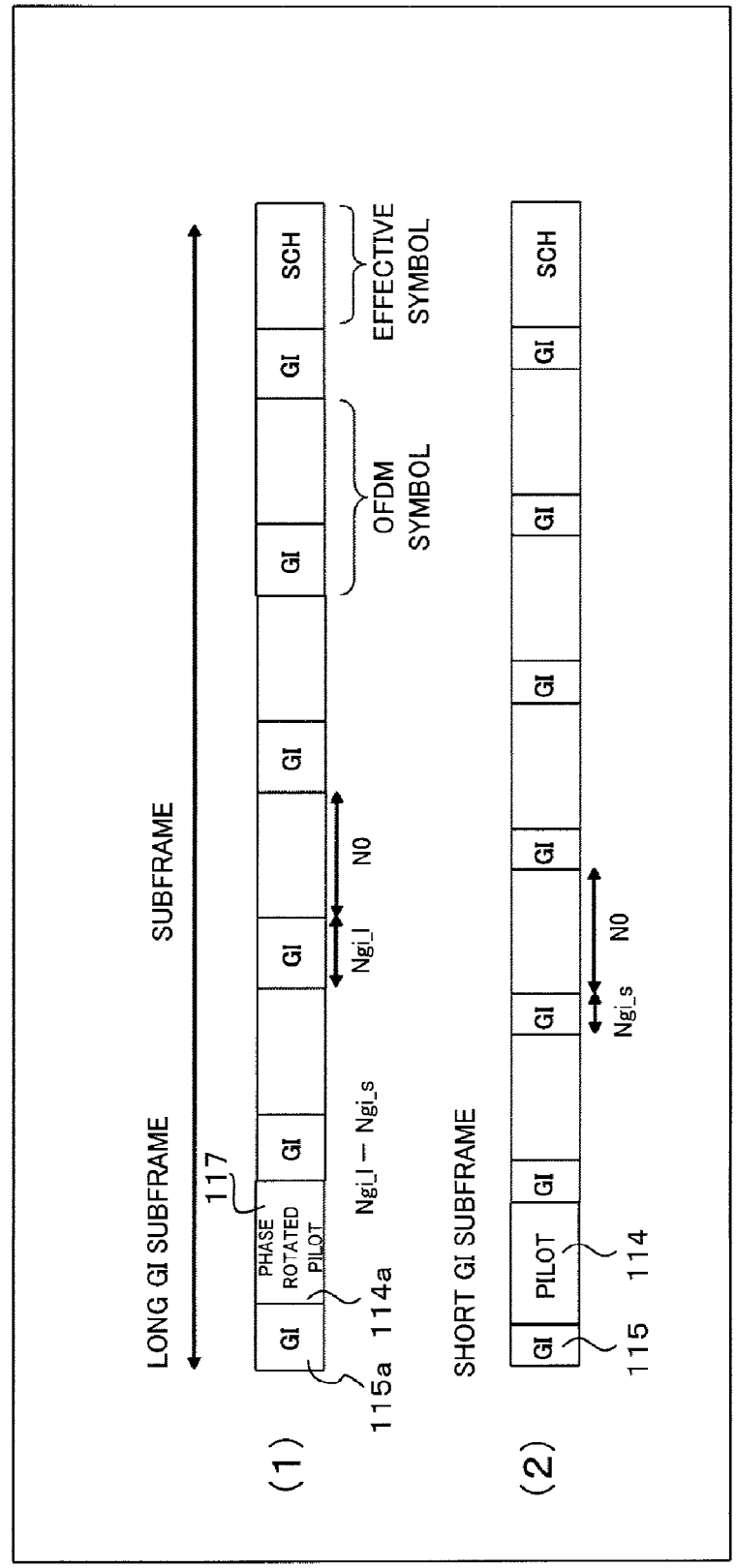
FIG. 22 is a diagram illustrating an example of a subframe format (time domain expression) according to the fifth embodiment.

Thereafter, by means of repeating the above described processing, a downlink radio signal is transmitted in the long GI subframe format shown in (1) of FIG. 22, for example, or in the short GI subframe format shown in (2) of FIG. 22.

That is, in the case of a long GI subframe, a guard interval having a length the same as that of a GI length Ngi_l which is added to the following effective symbols is added to before the effective symbol of the head of a subframe (see the reference character 115a), and a pilot symbol having been subjected to the above described phase rotation processing is inserted into the effective symbol of the head of the subframe (see the reference character 114a).

On the other hand, in a case of a short GI subframe, as in the case of (2) of FIG. 5, a guard interval having a length the same as that of a GI length Ngi_s which is added to the following effective symbols is added to before the effective symbol of the head of a subframe (see the reference character 115), and a pilot symbol which is not subjected to the above described phase rotation processing is also inserted into the effective symbol of the head of the subframe (see the reference character 114).

In this instance, the construction and the operation of the receiving end (mobile station 2) are the same as those of the first embodiment.

That is, in the present example, different from the above described first embodiment, it is possible to realize processing equal to that of the first embodiment, without adding any change to a subframe format itself (without adjusting the GI length to be inserted). Accordingly, since the present example is capable of not only realizing the effects and since the benefits equal to those of the first embodiment but also only trivial changes are merely necessary to be added to the already existing construction of a base station apparatus, the present example has increased versatility.

In this instance, the above-describe phase rotation processing is capable of being applied to the systems already described in the second to the fourth embodiment.

Further, in the above example, phase rotation processing in the frequency direction is given to the leading effective symbol of a long GI subframe by what is obtained by subtracting the shorter IG length Ngi_s from the long GI length Ngi_s. In contrast, the phase rotation processing (inverse rotation) in the frequency direction can be given to the leading effective symbol of a long GI subframe by what is obtained by subtracting the longer GI length Ngi_s from the shorter GI length Ngi_s (Ngi_s−Ngi_l). This corresponds to making the GI length of the leading effective symbol of a short GI subframe agree to the GI length of a long GI subframe, which is contrary to the above described example.

Further, in a case where three or more types of subframes of different GI lengths are used, the GI length of any one of the subframes (the minimum GI length is available, and the others are also available) is used as a reference, and phase rotation processing can be performed in accordance with a difference between the GI length of the reference subframe and the GI lengths of other subframes.

Furthermore, although phase rotation is given to the effective data of the leading symbol of a subframe in the above description, such phase rotation can be given to effective data of the second symbol or those thereafter. For example, phase rotation can be given to the effective data part of the third symbol of a short GI subframe and that of the second symbol of a long GI subframe. In such a case, a pilot is multiplexed to the effective data whose data beginning positions are apart from subframe timing by the same amount.

[F] One Preferred Embodiment of the Present Invention:

(F1) Description of an Overview of the Present Invention:

When data for MBMS (hereinafter, will be called MBMS information) is subjected to frequency-division multiplication (FDM) in a long GI subframe which is time division multiplexed, a part of area of a frequency band is limited for use in unicast, and to which MBMS information should not be multiplexed. This makes a detection subject limited to an area specified for unicast in detection of a scramble method (scramble code), thereby avoiding deterioration of a cell search performance due to a fact that a long GI subframe, to which a pilot insertion method different from that used in a short GI subframe, is multiplexed.

Figure 28:
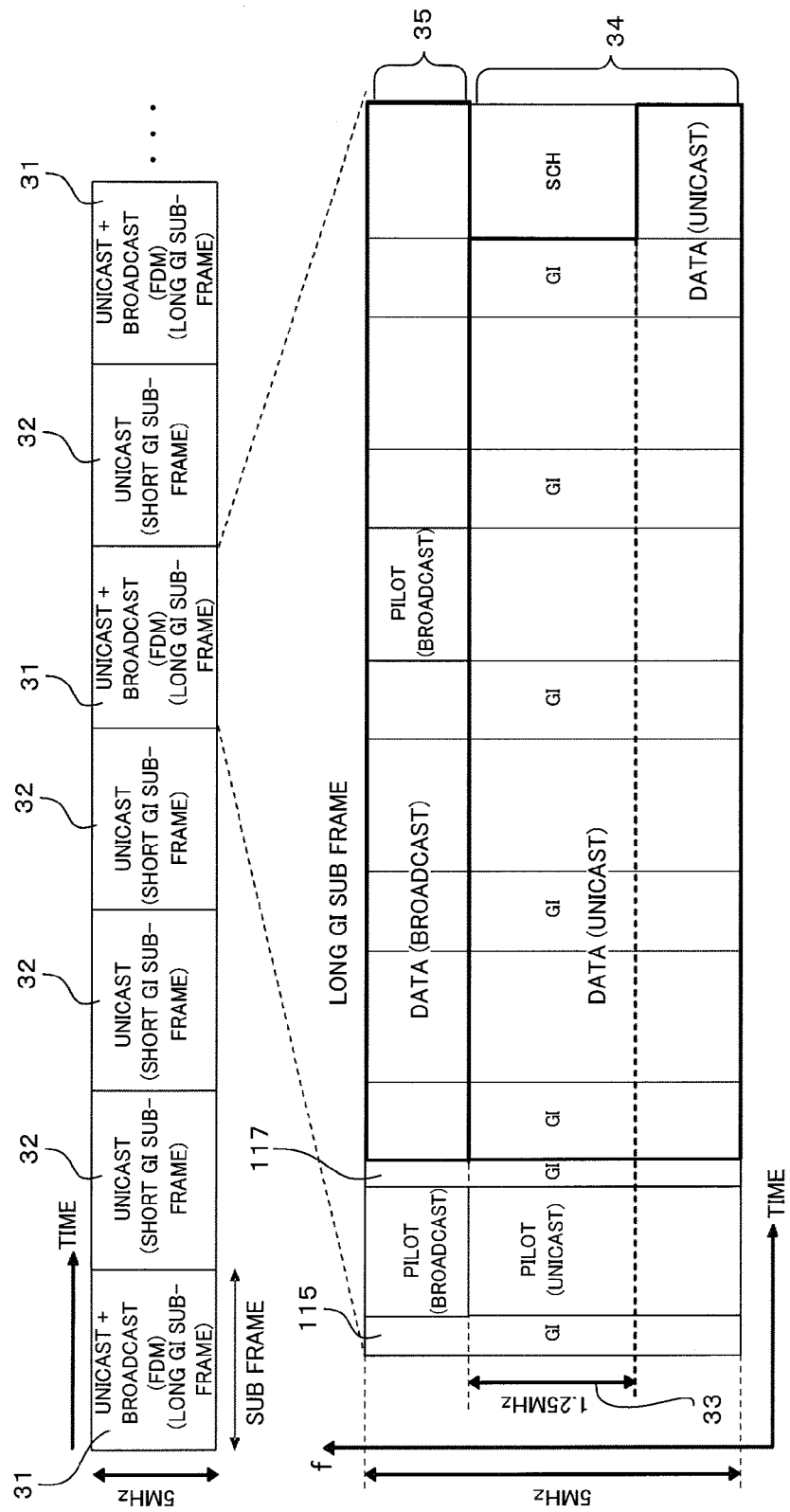
FIG. 28 is a diagram illustrating a frame format (downlink) according to one preferred embodiment of the present invention.

(F2) Channel Multiplexing Method:

FIG. 28 is a diagram illustrating a frame format (downlink) according to one preferred embodiment of the present invention. The upper frame of FIG. 28 has a predetermined (here, for example, 5 MHz) frequency band width, and long GI subframes 31 and short GI subframes 32 are time division multiplexed. As to the short GI subframes 32, data (hereinafter, will be also called unicast data) for unicast communications is multiplexed thereto; as to the long GI subframes 31, unicast data and MBMS information are frequency-division Multiplexed (FDM) as shown in the lower part of FIG. 28.

Here, in the present example, as shown in the lower part of FIG. 28, a part of the above mentioned frequency band width, for example, the band 34 at a lower frequency side containing a central band of 1.25 MHz (hereinafter, will be called the central band) 33 is used for multiplexing (transmitting) unicast data; the other band 35 at a higher frequency side thereof is used for multiplexing (transmitting) MBMS information. Then, at least in the central band 33, a pilot for unicast communications should at least necessarily be inserted (multiplexed) to the head of a subframe (long GI subframe) before transmission thereof. In the band 35 for MEMS information, a pilot for MBMS should be inserted (multiplexed) to the head of the subframe before transmission thereof.

As described above, in the subframe (long GI subframe 31), the positioning of MEMS information is limited. As a result, when the receiver end (mobile station) performs detection in the central band (1.25 MHz) of the leading symbol of the subframe at the time of cell search (detection of a scramble method performed at the time of initial synchronization), it becomes possible to avoid effects of interference of a pilot symbol for MBMS in averaging processing in multiple subframes.

In this instance, in FIG. 28, a synchronization channel (SCH) is multiplexed at least to the central band 33 of the end of a subframe. In addition, as in the case of each embodiments of the related art described above, the length of a guard interval is adjusted in such a manner that the position of the leading effective symbol of a subframe is the same as the position from frame timing. As a result, before the leading effective symbol of a long GI subframe, a part of a long guard interval of the long GI subframes 31, that is, a guard interval (see the reference character 115) of a length the same as the GI length Ngi_s of a short GI subframe 32 is inserted (multiplexed), and also, a guard interval of the remaining GI length of Ngi_l−Ngi_s (see the reference character 117) is inserted to the end of the effective symbol.

Accordingly, on the receiver end, as in the case of the above described embodiments, in FFT processing of the leading symbol of the subframe to which a pilot channel is multiplexed, a guard interval of Ngi_s [sample] is always removed from subframe timing, regardless of a difference of the subframe format of a reception signal (whether a long GI subframes 31 or a short GI subframes 32), so that it becomes possible to perform FFT processing always at optimal time divisions (FFT windows) without causing sample deviation.

Figure 29:
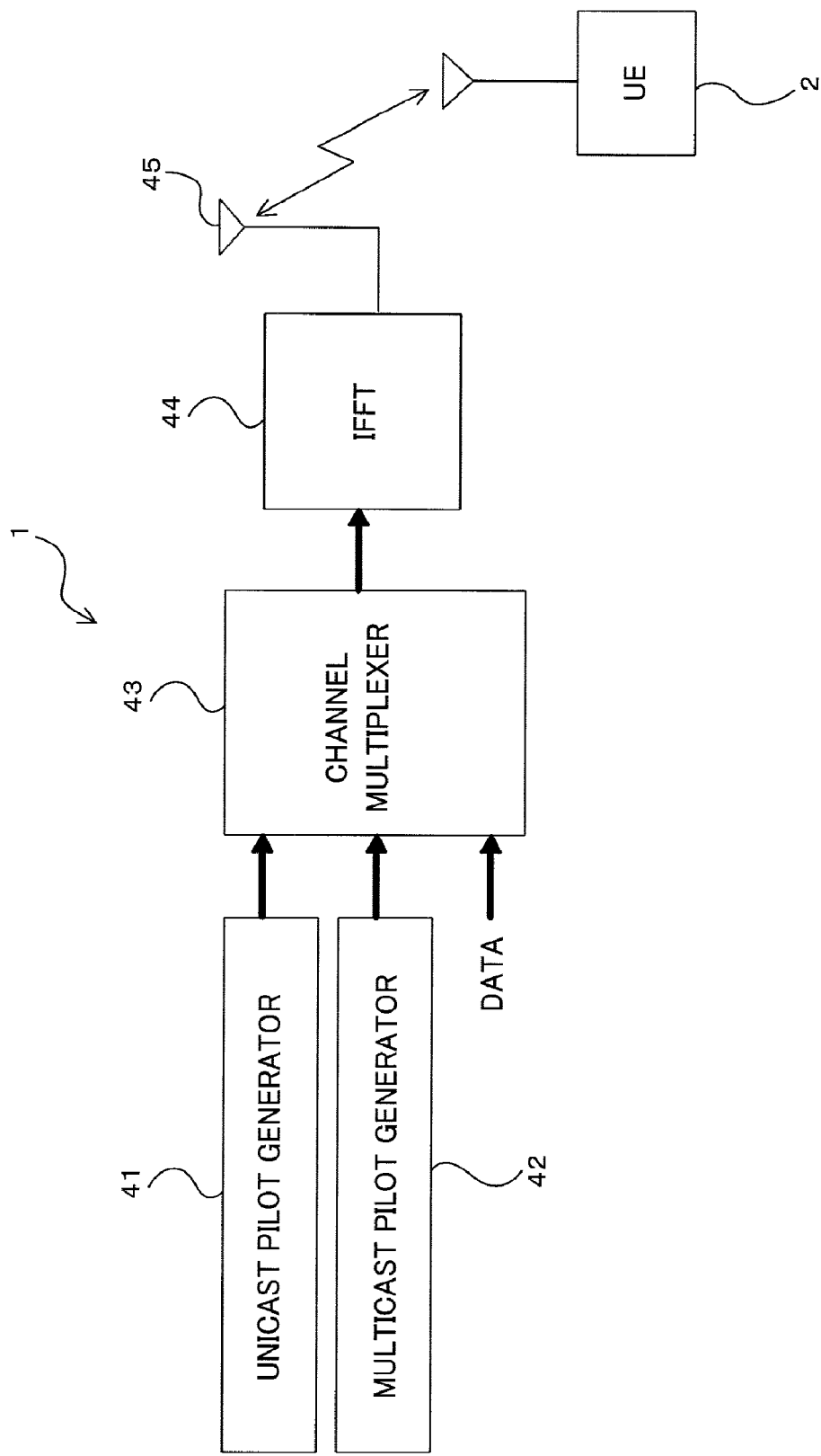
FIG. 29 is a block diagram illustrating a construction of a transmitter apparatus (transmitter) on a base station according to the present embodiment.

(F3) An Example of a Construction of a Base Station:

FIG. 29 shows an example of a construction of a base station (transmitter apparatus) which realizes the above frame (channel multiplex). A base station 1 in the present example can have a basic construction of the related art already described in its embodiments. However, with an attention paid to a significant part of the present example, the construction includes, for example, a unicast pilot generator 41; a multicast pilot generator 42; a channel multiplexer 43; an IFFT 44; and a transmitter antenna 45.

Here, the unicast pilot generator (producer) 41 generates a (first) pilot (hereinafter, will be also called "unicast pilot") for use in unicast communications; the multicast (/broadcast) pilot generator (producer) 42 generates a (second) pilot (hereinafter, will be also called "multicast pilot") for use in MBMS (that is, multicast or broadcast) communications.

Figure 31:
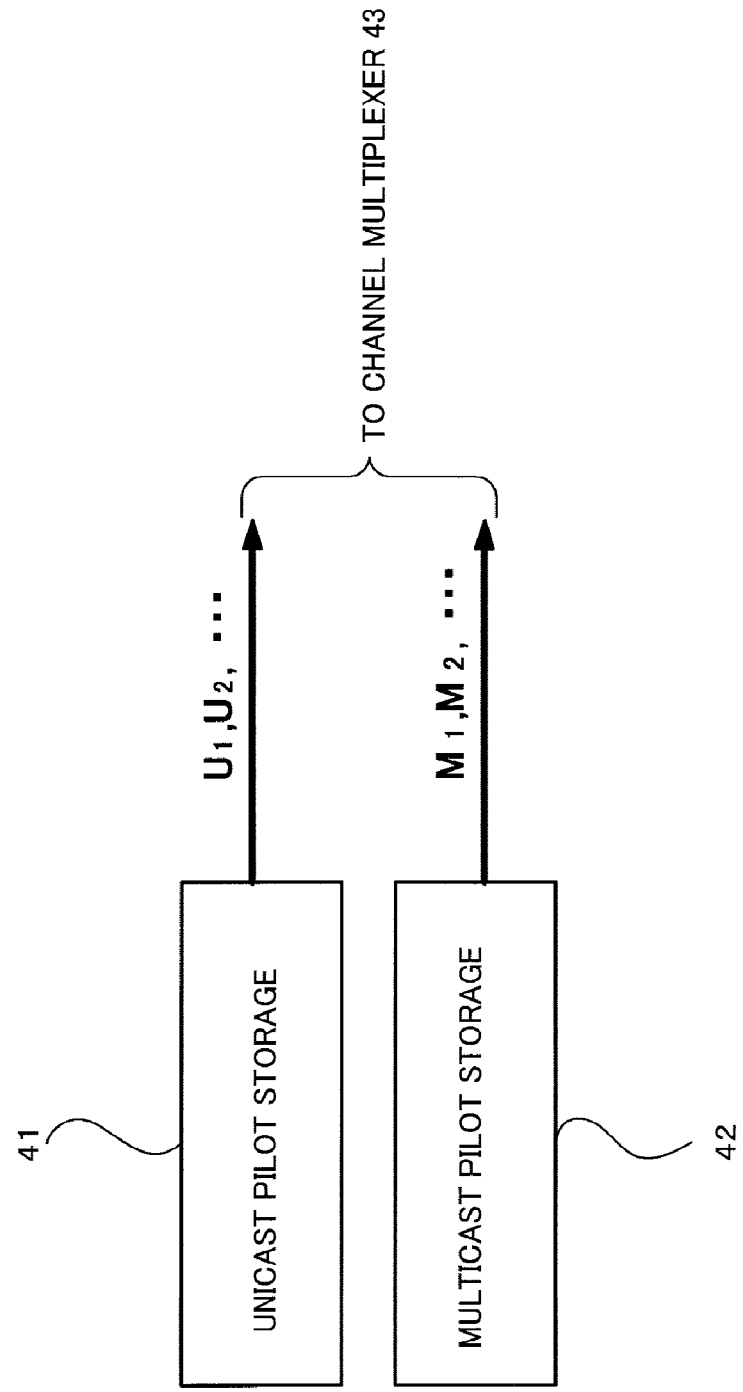
FIG. 31 is a block diagram illustrating an example of a construction of each pilot generator shown in FIG. 29.

That is, these pilot generators 41 and 42 function as pilot generating means which generate two kinds of pilots corresponding to two types of communications services, unicast communications and MBMS. As an example, as shown in FIG. 31, the pilot generators 41 and 42 can be formed by storages (a unicast pilot storage and a multicast pilot storage) storing beforehand respective pilot patterns [$U_k$ as the pattern of a unicast pilot (k is a natural number) and $M_k$ as the pattern of a multicast pilot]. Here, when a pattern which can be generated by a specific arithmetic processing is used as a pilot pattern, pattern generation can be performed by arithmetic processing without use of such storages. There are various well-known methods for generating pattern series by arithmetic processing. For example, as described in the above non-patent document 6, it is possible to realize the arithmetic processing by use of a shift register.

Figure 30:
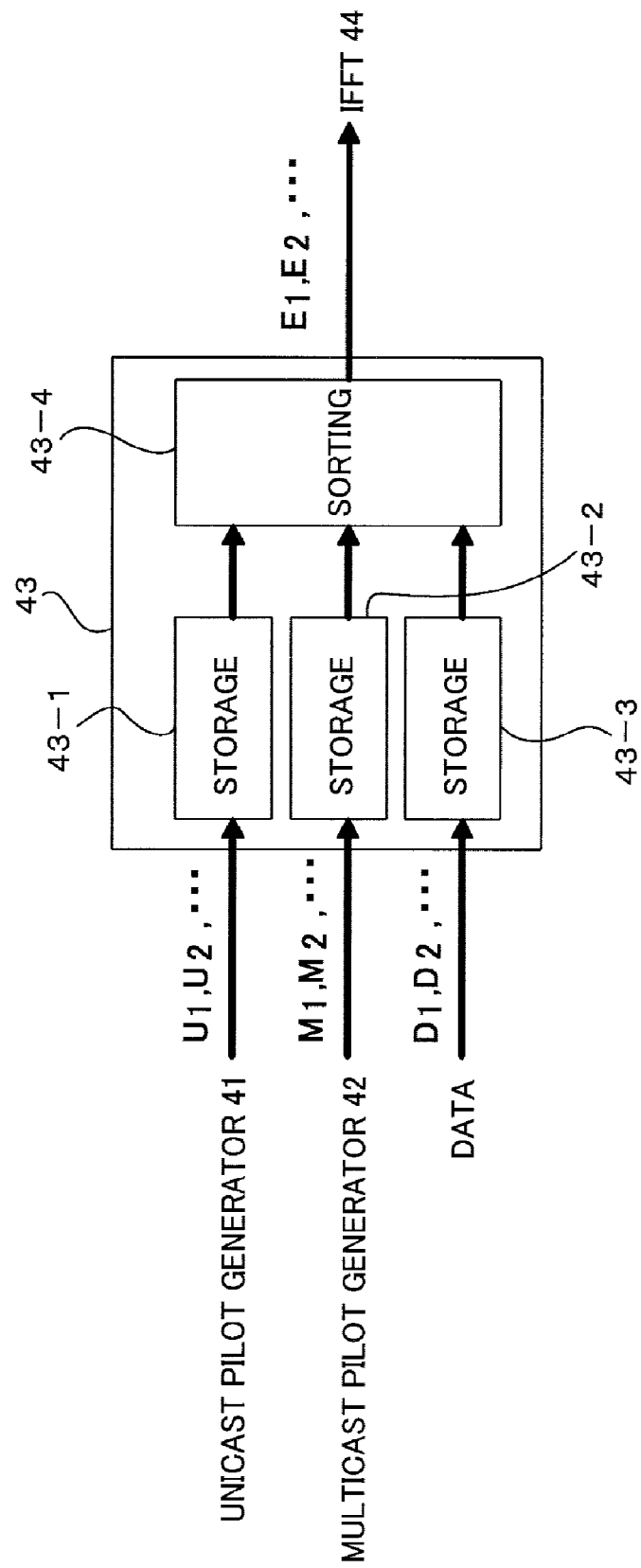
FIG. 30 is a block diagram illustrating an example of a construction of a channel multiplexer shown in FIG. 29.

The channel multiplexer 43 multiplexes pilots ($U_k$ and $M_k$) from the pilot generators 41 and 42 and data ($D_k$) of other channels (synchronization channel, data channel, and other channels) to be transmitted. For example, as shown in FIG. 30, the channel multiplexer 43 includes: a storage 43-1 for a unicast pilot; a storage 43-2 for multicast pilot; a storage 43-3 for the above mentioned data; and a sorter 43-4.

The storage 43-1 stores a unicast pilot ($U_k$) from the unicast pilot generator 41; the storage 43-2 stores a multicast pilot ($M_k$) from the multicast pilot generator 42; the storage 43-3 stores data of the above mentioned channels.

In order to perform transmission with the frame format already described with reference to FIG. 28, the sorter 43-4 outputs information stored in the storages 43-1, 43-2, and 43-3 to the IFFT 44 in a predetermined order in time sequence. For example, assuming that N is given as the unit of processing (FFT size) in the IFFT 44, the IFFT 44 performs processing in a block-like manner for each OFDM symbol unit and for each N[sample], so that the sorter 43-4 outputs an output series $E_k$ in the following manner, beginning from the leading frame, for each symbol 1, 2, 3, . . . .

First symbol output=$E_k$ (k=1, 2, . . . , N)

Second symbol output=$E_k$ (k=N+1, N+2, . . . , 2N)

. . .

n symbol output=$E_k$ (k=(n−1)N+1, N+2, . . . , nN)

When transmission is performed with the frame format shown in FIG. 28, the sorter 43-4 outputs the following output series $E_k$ in each of the above symbols, given $N_s$ as the number of OFDM symbols included in a single frame.

$E_k=U_k$ for (k∈[1, Nu])

$E_k=M_{k-Nu}$ for (k∈[Nu+1, N])

$E_k=D_{k-N}$ for (k∈[N+1, Ns×N])

In this instance, the above output series $E_k$ is input to the IFFT 44 after being converted into a frequency domain signal by a non-illustrated serial/parallel conversion processor (or FFT) and mapped to each subcarrier.

The IFFT 44 performs IFFT processing to an input series $E_k$, which is frequency signal, to convert the signal into a time domain signal. The transmitter antenna 45 sends out the transmission signal as a radio signal, after being subjected to the IFFT processing, to propagation paths. Here, as in the case of the embodiment already described with reference to FIG. 1, the signal after being subjected to the IFFT processing is output to the transmitter antenna 45 after a guard interval of a necessary GI length is inserted thereinto by the guard interval inserter and being subjected to radio transmission processing such as frequency conversion (up conversion) into a radio frequency. Further, as to a guard interval inserting method, it is possible to apply the methods of the embodiments of the above-described related art.

That is, the channel multiplexer 43, the IFFT 44, and the transmitter antenna 45 executes functions of transmitting at least any one (here, unicast pilot) of the multiple pilots using a predetermined band 33 which has been set beforehand in a part of a transmission band and of transmitting the other pilots (multicast pilot) using transmission bands other than the predetermined band 33.

The above described construction enables the base station 1 to transmit a downlink signal in the frame format shown in FIG. 28. That is, in the channel multiplexer 43, as described above, a unicast pilot $U_k$ from the unicast pilot generator 41, a multicast pilot $M_k$ from the multicast pilot generator 42, and data $D_k$ are output by the sorter 43-4 in a predetermined sequence (as the above mentioned output series $E_k$), and is then output through the transmitter antenna 45 to a propagation path after being subjected to mapping processing to a subcarrier, IFFT processing by the IFFT 44, and radio transmission processing.

Figure 32:
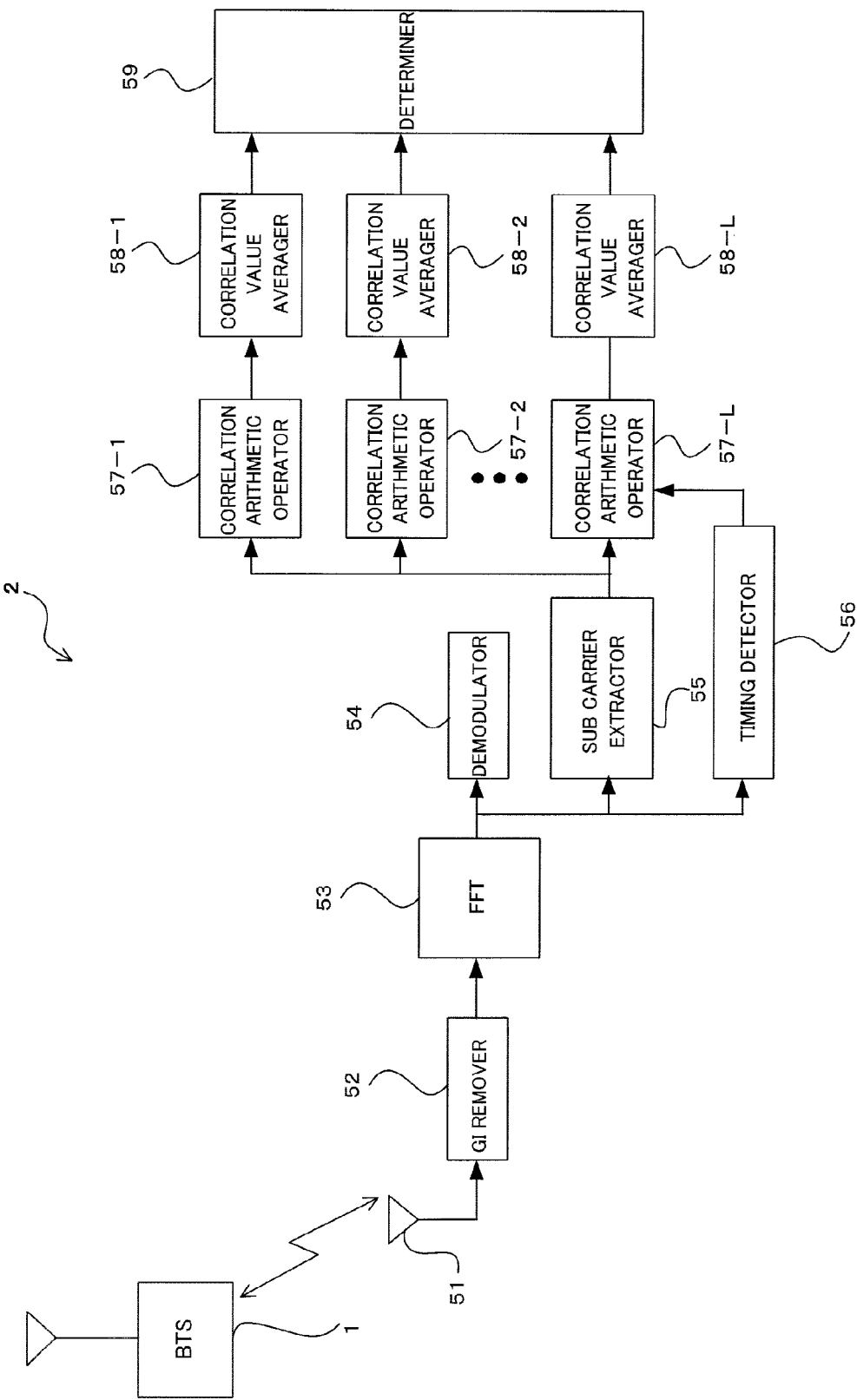
FIG. 32 is a diagram illustrating a construction of a mobile station (receiver) according to the present embodiment.

(F4) An Example of Construction of Mobile Station:

On the other hand, as shown in FIG. 32, the mobile station 2 includes: a receiver antenna 51; a guard interval (GI) remover 52; an FFT 53; a demodulator 54; a subcarrier extractor 55; a timing detector 56; the correlation arithmetic operators 57-1 through 57-L corresponding to the number of candidate scramble codes (L); the correlation value averager 58-1 through 58-L corresponding to such correlation arithmetic operators 57-1 through 57-L; and a determiner 59. In this instance, cell search processing (each of the first stage and the second stage processing) is basically performed on the mobile station 2 in a manner similar to that of the first to the fifth embodiment of the already described related art.

Here, the receiver antenna 51 receives a radio signal transmitted from the base station 1 in the frame format (a long GI subframe 31 and a short GI subframe 32) shown in FIG. 28. The GI remover 52 removes guard intervals inserted in the radio signal. The FFT 53 performs FFT processing to the reception signal from which guard intervals are removed by the GI remover 52 with subframe timing detected at the first stage of cell search processing.

In this instance, although not illustrated in FIG. 32, the radio signal received by the receiver antenna 51 is subjected to radio reception processing, including frequency conversion (down conversion) into a base band signal and analogue/digital (A/D) conversion, or the like, performed by a non-illustrated radio unit, and then is input to the GI remover 52.

The demodulator 54 demodulates the reception signal after being subjected to the FFT processing with the demodulation scheme corresponding to the modulation scheme used on the base station 1 end. The subcarrier extractor 55 extracts a certain subcarrier from the reception subframe. In the present example, the subcarrier extractor 55 extracts (detects) a signal of at least the central band 33 already described with reference to FIG. 28, that is, a subcarrier domain (hereinafter, will be called "a unicast pilot predetermined band" or simply called "a predetermined band") to which a unicast pilot is assured to be inserted.

The timing detector 56 detects the timing of a pilot channel from a frequency domain signal after being subjected to the FFT processing, and then outputs the detected timing to each correlation arithmetic operator 57-$i$ ($i$=1 through L) as correlation arithmetic operation timing.

The correlation arithmetic operators 57-$i$ each execute a correlation arithmetic operation between the signal (a signal of the central band 33) extracted by the subcarrier extractor 55 and the i-th candidate scramble code (pilot replica), of multiple kinds of scramble codes (patterns); the correlation value generator 58-$i$ averages the correlation values obtained by the correlation value generator 58-$i$ by the predetermined number of symbols, to obtain their average value.

Then, the determiner 59 decides that, for example, a scramble pattern exhibiting the maximum correlation value, of the correlation values (electric power) with multiple kinds of candidate scramble codes output from each correlation value generator 58-$i$, is being transmitted from the base station 1.

With the above described construction, in the mobile station 2 of the present example, the subcarrier extractor 55 detects a signal of a subcarrier domain to which a signal of the central band 33, that is, a unicast pilot, is assured to be inserted, and each correlation arithmetic operator 57-$i$ performs an arithmetic operation of correlation with candidate scramble codes with respect to the detected signal. Then, a scramble code that exhibits the maximum average value of the correlation is given as a detected scramble code.

Accordingly, even if a multicast pilot is frequency-division multiplexed to the same time domain in the same subframes 31, the multicast pilot will not cause interference, so that it becomes possible to perform scramble code detection correctively, and this enables avoidance of deterioration of cell search performance.

In this instance, the above example shows a construction in which detection using only a band to which a unicast pilot is assured to be inserted. However, detection of initial synchronization is available without any changes added to the construction of the mobile station 2 according to each embodiment of the already described related art. In addition, there can also be provided another construction in which the subcarrier extractor 55 performs an output operation, with a non-assured band component being contained in a part of the output, not an operation of extraction (detection) with limitation to the predetermined band 33 of a unicast pilot.

With such differences in construction, engineers are able to select a design which appears optimal, with a deep consideration given to the following trade-off in terms of performance.

a) Trade-Off in Terms of Performance:

That is, the above example enables detection even when time-division multiplexing is performed under the condition where long GI subframes 31 and short GI subframes 32 are mixed, without causing interference thereof. However, for example, when the frequency of generation of long GI subframes 31 (that is, the number of multiplexes) is extremely small, the construction in which only a part of a subcarries is extracted for using it in a correlation arithmetic operation and scramble code detection has a probability of a disadvantage of reduction of signal components which can be used in such an arithmetic operation and detection, resulting in a lowered detection ability. In other words, it is trade-off between a merit of reduction of the interference amount by long GI subframes 31 and a demerit caused by the reduction of signal components.

Hence, in a case where a construction in which band components other than the unicast pilot predetermined band 33 is partly used in the above correlation arithmetic operation and detection is used, the optimal value of a ratio of band components to which degree band components other than the predetermined band 33 are used must exist. However, since this optimum value is to be decided with consideration paid to a ratio of insertion of long GI subframes 31 and multicast pilots and the processing amount of the mobile station (receiver) 2, engineers who construct mobile stations 2 should determine the optimal value.

(F5) An Example of Modified Example (in a Case Where MBMS Allocation Limitation is Used Only in a Broad Band):

The following is a case of a system in which the base station (transmitter) 1 performs transmission using more than one frequency band (transmission band width). As an example, in the above non-patent document 6, a system is assumed which has a probability of existence of multiple downlink transmission band widths of such as 1.25 MHz, 2.5 MHz, 5 MHz, 10 MHz, 15 MHz, and 20 MHz. In such a system, when a unicast predetermined band 33 of the same band width is set in the base station 1 having any transmission band width, it is necessary to make the predetermined band be not higher than 1.25 MHz (otherwise, a base station 1 to which only a narrow transmission band width is allocated cannot multiplex MEMS information).

Thus, in such a system in which more than one transmission band width exists, it is preferable that a construction is given in which the width of the unicast predetermined band 33 is made to have a width depending upon the transmission band width of the base station 1 (that is, a variable width). That is, the wider (or the narrower) transmission band width the base station 1 has, the wider (or narrower) unicast predetermined band 33 is set. This makes it possible to detect an accurate scramble code, avoiding interference due to the multicast pilot, while assuring multiplexing of MBMS information.

Further, such a construction makes it possible that a wider unicast predetermined band 33 is set for a base station 1 having a wider transmission band, so that the bands (signal components) which can be used in scramble code detection are increased, a detection ability being thereby improved.

(F6) In a Case Where Only One GI Length Exists:

In the already described examples, a description is made of a case where multiple subframes having different GI lengths are present. However, such an existence of multiple subframes of different GI lengths is dispensable in the present invention. In the above described example, when unicast communications and multicast communications use different pilots, even if there is only one kind of GI length, a correlation value with frames using different pilots input at averaging processing performed by the correlation value averager 58-$i$ will become an interference in averaging processing.

Hence, by means of setting a unicast predetermined band 33 beforehand as described above, and with a construction of a receiver which processes the predetermined band 33 after detection, it is possible to reduce such interference due to multiplexing of different pilots.

In this instance, the present invention should by no means be limited to the above described embodiment, and various changes or modifications may be suggested without departing from the gist of the invention.

For example, although pilot patterns are assumed to be different for unicast and multicast in the example already described with reference to FIG. 28 through FIG. 32, the same pilot pattern can be used.

Further, since a feature of the present invention is the presence of a unicast predetermined band 33 in a frame without exception, it is not necessary that the predetermined band 33 be the central band of the transmission band or a band containing the central band. More than one predetermined band 33 can be set in the transmission band. If the unicast pilot predetermined band 33 is set at the central band 33 (or a band containing the central band 33) in such a manner that is described in the above described example, though, it becomes possible to detect a unicast pilot with reliability by means of giving a mobile station 2 end at least a function of detecting a signal in the central band 33, even when the transmission band width of the base stations 1 is different thereamong. Accordingly, it is not necessary to change the construction and the setting of the mobile station 2 end for each transmission band width, so that general versatility is enhanced.

Furthermore, the following do not cause differences: whether or not a multicast pilot is present in the same time domain (symbol position) as that of a unicast pilot; and whether or not data is mapped at a time domain (symbol position) different from that of a unicast pilot.

INDUSTRIAL APPLICABILITY

As detailed above, according to the present invention, at least any one of the multiple pilot signals is transmitted using a predetermined band which is set beforehand in a part of the transmission band. The receiver detects a signal of a band containing at least the predetermined band, out of the reception signals, and then detects the pilot signal from the detected signal. Hence, even if another pilot signal is frequency-division multiplexed to the same time domain, it is possible to accurately detect a pilot signal while avoiding the effect of interference by the pilot signal. Accordingly, deterioration of a cell search ability on the receiver can be avoided, and the invention is thus considered to be extremely useful in the field of radio communications technology, in particular, in the field of mobile communications.

What is claimed is:

1. A communications system, comprising
a transmitter; and
a receiver that performs radio communications with the transmitter in a plurality of types of communications services,
wherein the transmitter includes,
a controller that controls guard intervals of at least any one of a plurality of codes, which are unique to respective cells and correspond to any one of the plurality of types of communications services, so that lengths of guard intervals of the plurality of codes become same; and
a transmitting unit that transmits first codes among the plurality of codes using a first band set in a transmission band, and also transmits second codes among the plurality of codes different from the first codes using a second band set in the transmission band different from the first band set, and
wherein the receiver includes,
a receiving unit that receives the plurality of codes transmitted from the transmitter.

2. A communications system, comprising
a transmitter; and
a receiver that performs radio communications with the transmitter in a plurality of types of communications services,
wherein the transmitter includes,
a controller that controls guard intervals of at least any one of a plurality of codes, which are unique to respective cells and correspond to any one of the plurality of types of communications services, and that sets starting positions of the plurality of codes to be transmitted in a subframe become identical; and
a transmitting unit that transmits the plurality of codes to the receiver, and
wherein the receiver includes,
a receiving unit that receives the plurality of codes transmitted from the transmitter.

* * * * *